Sept. 4, 1962  B. G. COPPING  3,052,071
ARTICLE CASER APPARATUS
Filed Oct. 15, 1959  10 Sheets-Sheet 1
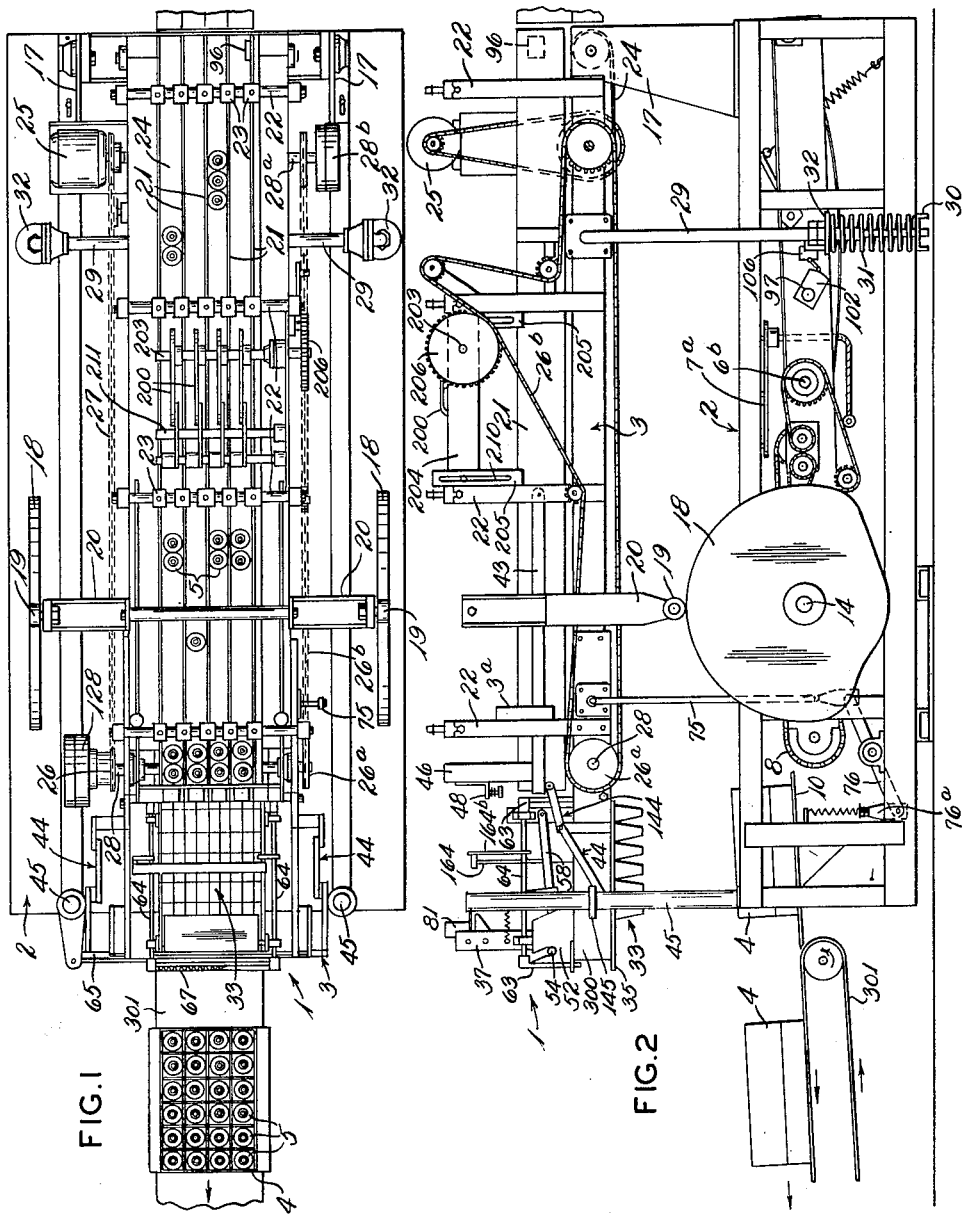
*INVENTOR.*
BRUCE G. COPPING
BY Oldham & Oldham
ATTYS.

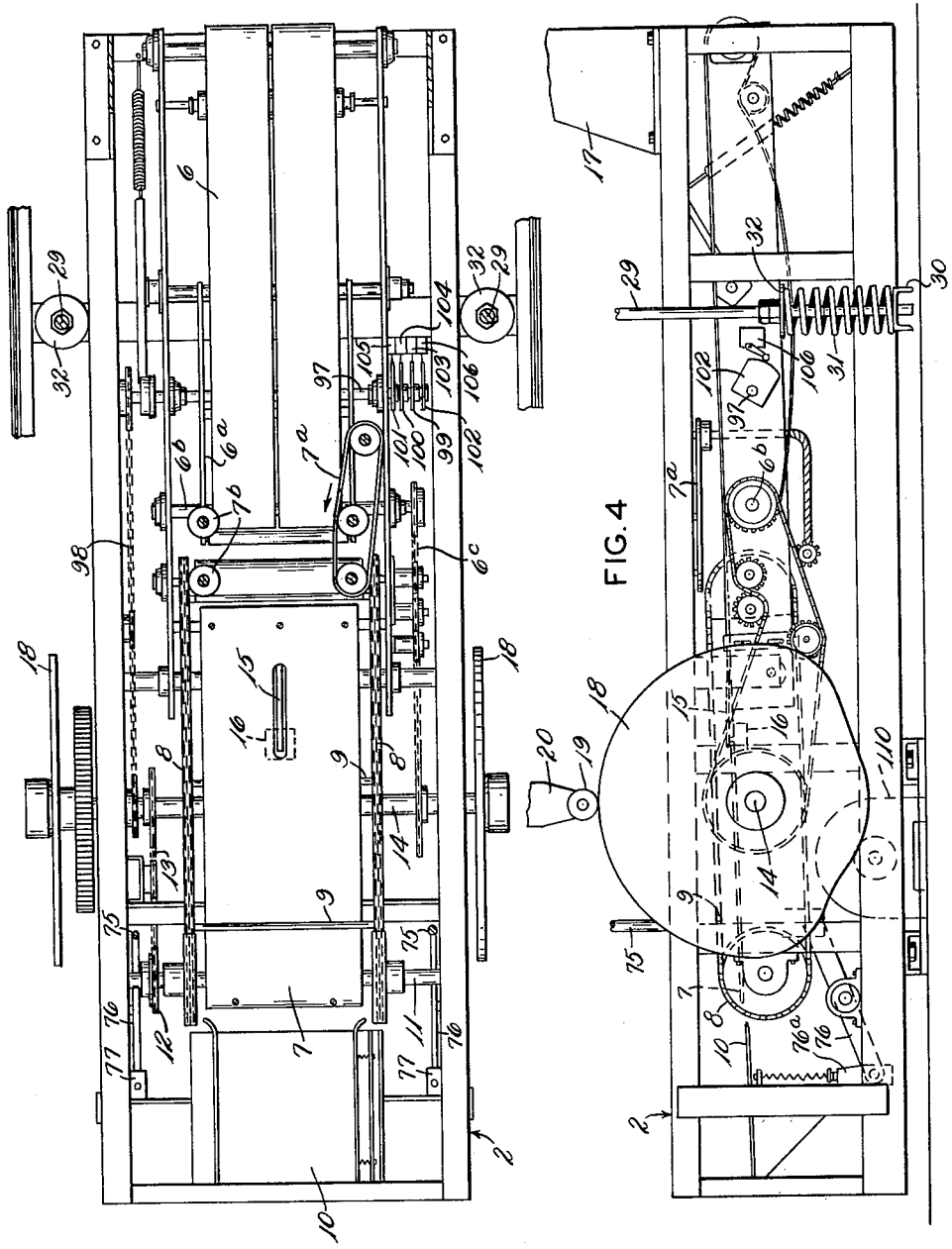

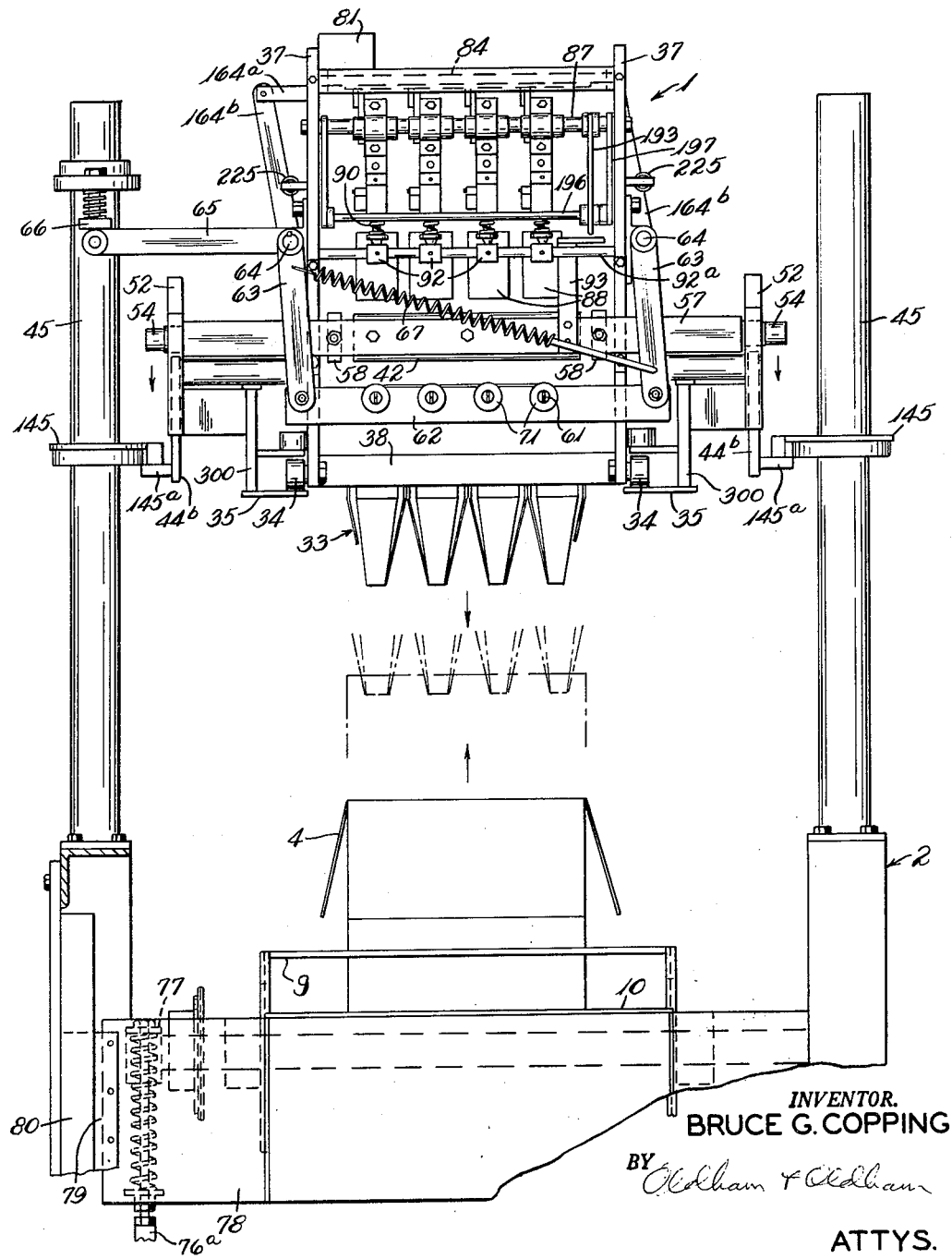

Sept. 4, 1962   B. G. COPPING   3,052,071
ARTICLE CASER APPARATUS
Filed Oct. 15, 1959   10 Sheets-Sheet 4

INVENTOR.
BRUCE G. COPPING
BY Oldham & Oldham
ATTYS.

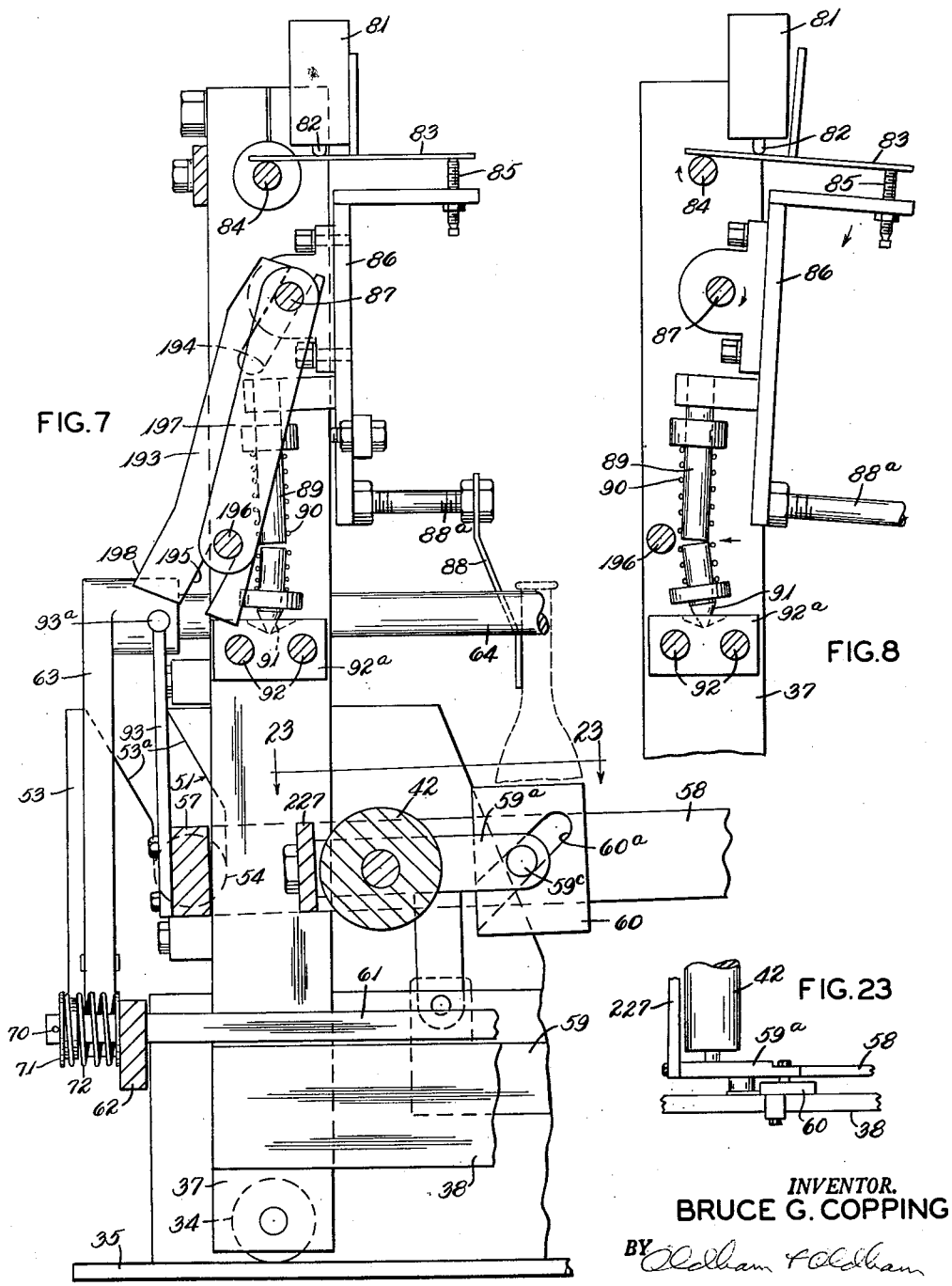

Sept. 4, 1962   B. G. COPPING   3,052,071
ARTICLE CASER APPARATUS
Filed Oct. 15, 1959   10 Sheets-Sheet 6
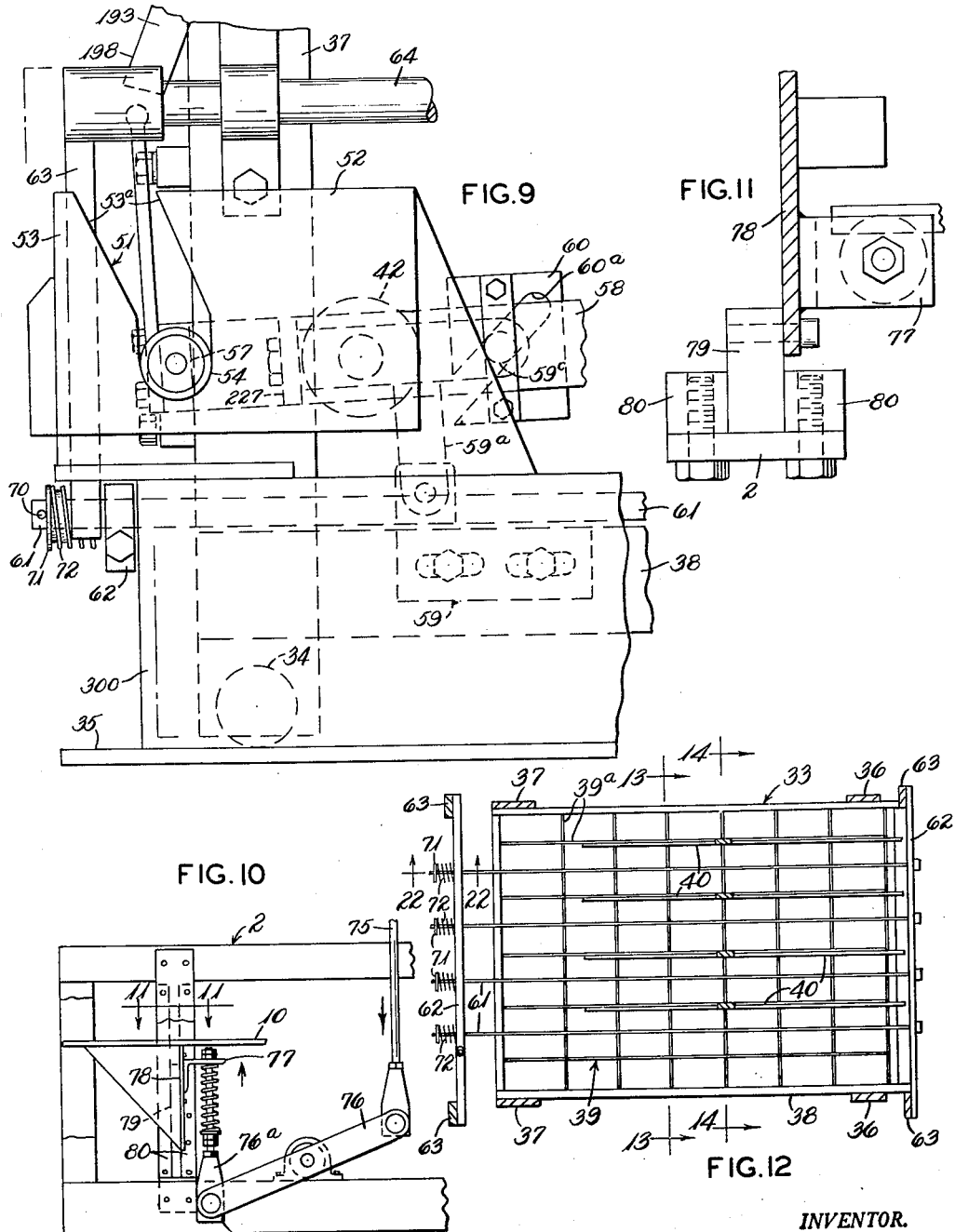
INVENTOR.
BRUCE G. COPPING
BY
ATTYS.

Sept. 4, 1962 B. G. COPPING 3,052,071
ARTICLE CASER APPARATUS
Filed Oct. 15, 1959 10 Sheets-Sheet 7
FIG.13
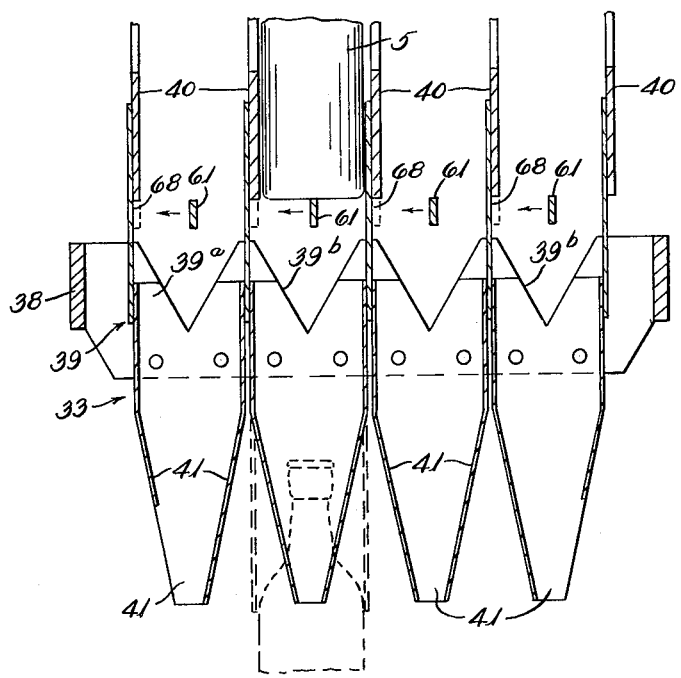
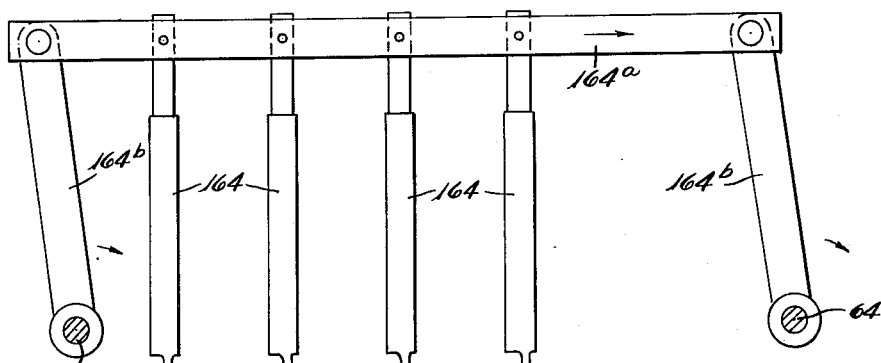
FIG.14
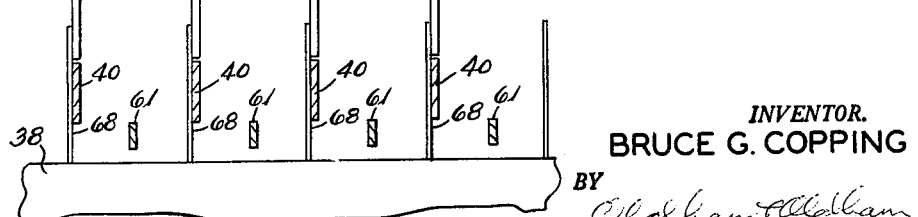
INVENTOR.
BRUCE G. COPPING
BY
ATTYS.

Sept. 4, 1962   B. G. COPPING   3,052,071
ARTICLE CASER APPARATUS
Filed Oct. 15, 1959   10 Sheets-Sheet 8
FIG.15
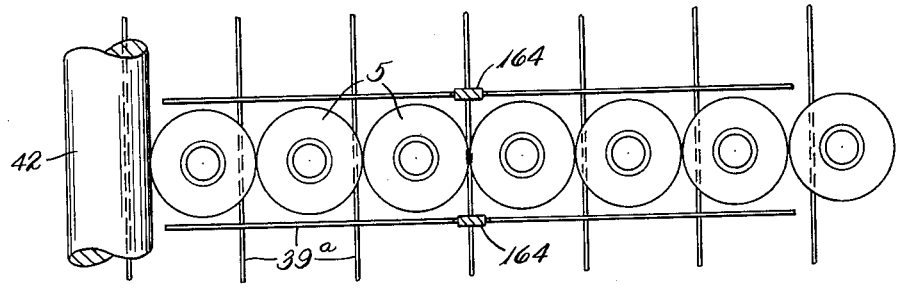
FIG.16
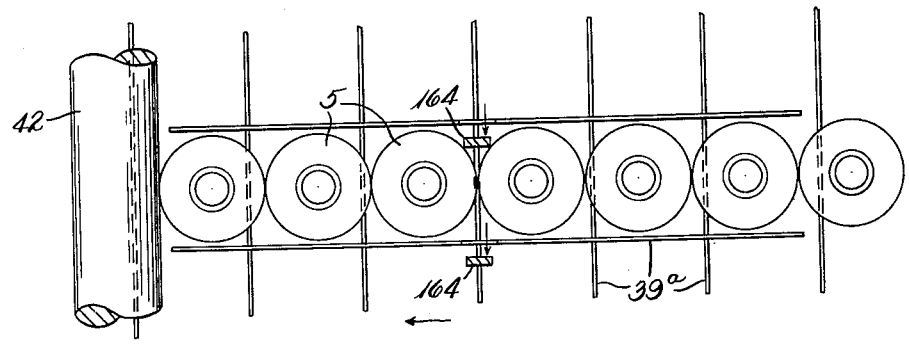
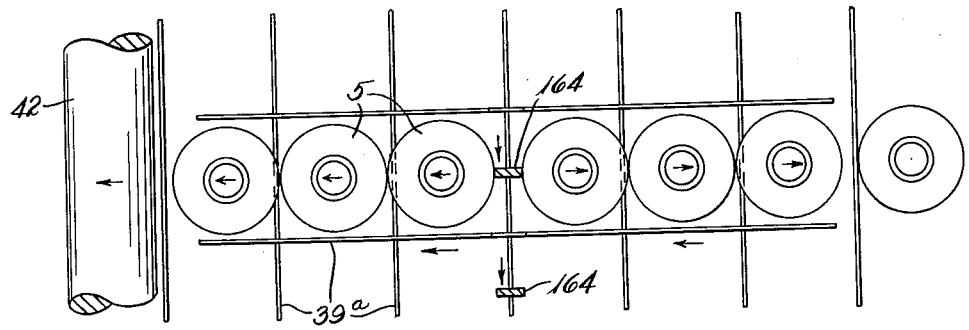
FIG.17
INVENTOR.
BRUCE G. COPPING
BY
ATTYS.

Sept. 4, 1962　　　　B. G. COPPING　　　　3,052,071
ARTICLE CASER APPARATUS
Filed Oct. 15, 1959　　　　　　　　　　10 Sheets-Sheet 9
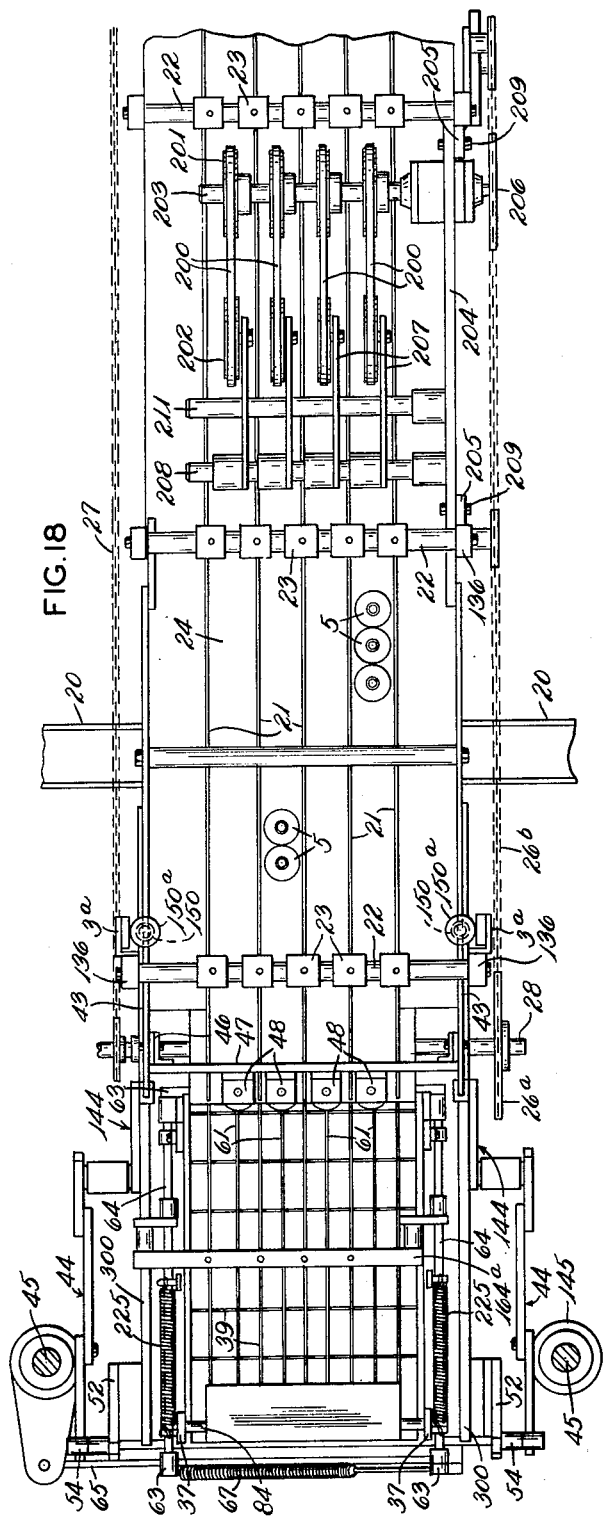
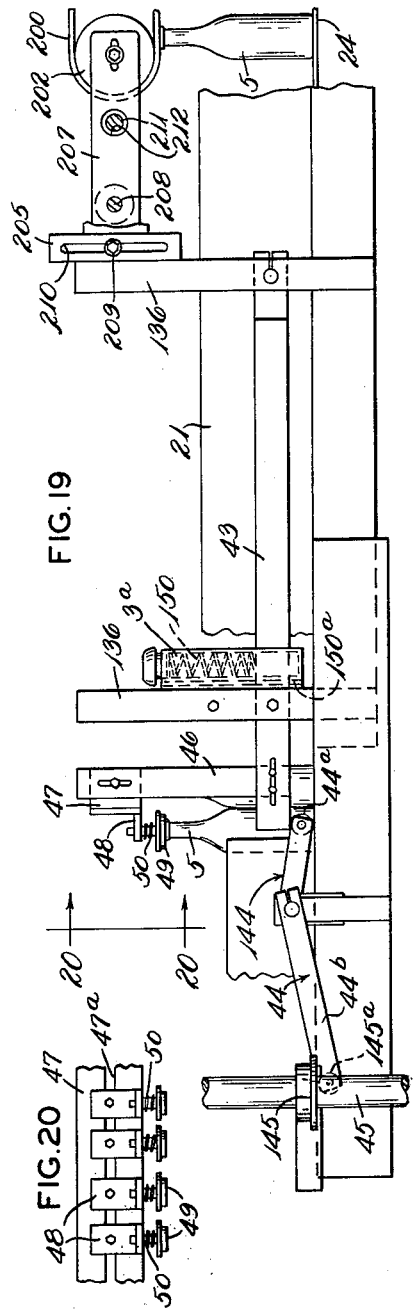
*INVENTOR.*
BRUCE G. COPPING
BY Oldham & Oldham
ATTYS.

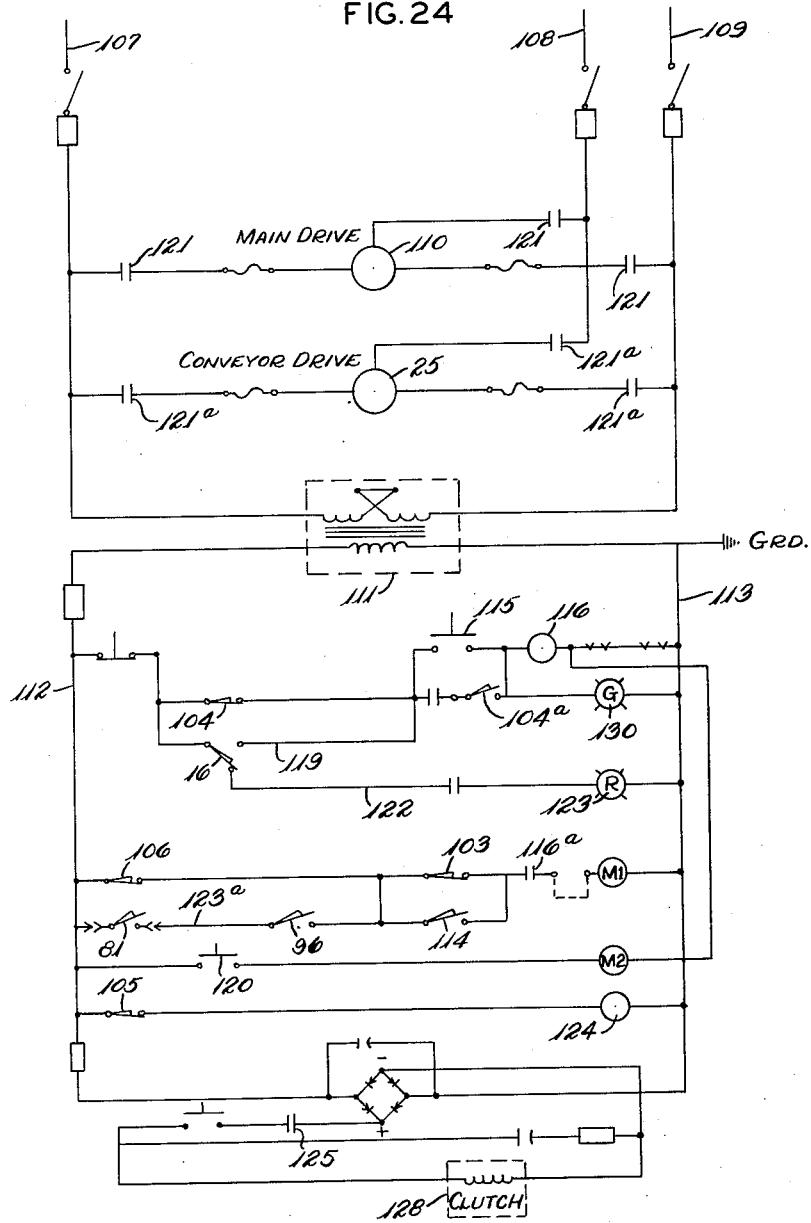

United States Patent Office 3,052,071
Patented Sept. 4, 1962

3,052,071
ARTICLE CASER APPARATUS
Bruce G. Copping, Akron, Ohio, assignor to Atkron, Inc., Cuyahoga, Ohio, a corporation of Ohio
Filed Oct. 15, 1959, Ser. No. 846,683
36 Claims. (Cl. 53—62)

This invention relates to article casing apparatus, especially to apparatus for receiving streams of aligned articles and automatically arranging the proper number of such articles in case filling positions and then depositing such articles in a case to fill the case with the articles.

Heretofore there have been various types of article casing apparatus provided, and one example of such apparatus is that used for filling soft drink cases or the like with bottles, cans or the like, but the invention relates to packing or casing apparatus for articles of any type fed to it in streams of articles ready for packing. It always is a problem in apparatus of this type to provide a machine that will operate automatically over long periods of time, and which will process large numbers of bottles or other articles safely without damage to any of the articles being processed.

Prior types of apparatus, insofar as I am aware, have operated satisfactorily but have been objectionable as to the quantities of articles packaged in a given time. Most prior types of apparatus have been quite bulky, and it is very desirable that these machines or apparatus be reduced to as small a volume area as is possible. Likewise, the problem of maintenance is very important on machines or apparatus of this type, and preferably a substantially foolproof type of operation should be provided by the apparatus which should be self controlling in the sense that if articles or cases for the articles are not properly positioned, supplied, and processed in the machine, the machine will automatically interrupt its operative cycles until the deficiency is corrected.

The general object of the present invention is to provide a novel and improved article casing apparatus characterized by the feature of moving a number of articles when arranged in case filling position towards a prepositioned case, and to effect certain control and movement operations on these articles as they are being moved as a unit towards the case.

Another object of the invention is to provide a brake or clamp means for the next members of a stream of articles arranged for feeding into case filling positions, when separating out a case filling unit or group of the articles from the remaining articles being processed.

Another object of the invention is to provide an apparatus having a sub-frame pivotally positioned therein and positioning a bottle transporting conveyor and a case filling grid thereon, which sub-frame, conveyor and grid unit can be moved as a unit towards a case for depositing bottles therein rapidly and safely.

Another object of the invention is to provide apparatus for filling a case with articles wherein both the case positioning means and a grid containing articles in case filling positions are moved towards each other for case filling action.

Another object of the invention is to feed rows of bottles in side abutting contact into substantially case filling positions, and to complete the positioning of the bottles in substantially exact case filling positions for deposit into a case by moving separation elements between the abutted bottles to space them slightly from each other.

Yet other objects of the invention are to move abutted rows of bottles relatively rapidly into a case filling grid assembly, and to slow down the movement of such bottles prior to complete halt of the bottles by abutment against a stop roller; and to move such stop roller slightly in a downstream direction to permit slight additional movement of the bottles for substantially exact case filling positioning of the bottles.

Another object of the invention is to feed or move relatively light weight empty cases positively from the input conveyor to the final feed conveyor for the case to facilitate rapid processing of the cases for filling action by the apparatus of the invention.

Another object of the invention is to reciprocate an entire bottle feeding conveyor and grid assembly vertically about an upstream pivot point thereof to cut in half, substantially, the time required for relative movement between the case filling grid and a case to insure safe deposit of bottles into the case by gravity dropping action.

A further object of the invention is to provide a removable case filling grid head in the apparatus and with such grid head assembly and associated means being removable as a unit so that alternate grid assemblies can be used for handling different sizes of bottles or bottles arranged in different manners for case filling action.

Other objects of the invention are to provide automatic means in the apparatus for interrupting its action cycle should articles not be fed thereto in the number of streams and quantities required for case filling action; to halt operation of the machine or apparatus if any portion thereof processing the cases or articles is not functioning properly; to provide relatively uncomplicated control means in the apparatus to clamp onto end articles in a stream of articles during movement of the case filling grid towards an empty case; to move the grid and a group of articles therein longitudinally as a unit to separate them from the stream of articles to be processed when the articles and grid are being moved towards a case for deposit therein; to start, positively and immediately, feed of articles to a case filling grid when the grid is ready for case filling action and when the article clamp means is released; and to provide a plurality of individually actuated control fingers corresponding in number to the number of rows of articles being processed in the machine to operate a control switch in the main drive circuit to stop feed of cases through the apparatus should articles not be fed into the case filling grid in the required number of streams and articles required for continuous case filling cycles in the apparatus and to restart such cycling as soon as sufficient articles are supplied to the grid.

The foregoing and other objects and advantages of the invention will be made more apparent as the specification proceeds.

Attention now is particularly directed to the accompanying drawings wherein one currently preferred embodiment of the principles of the invention is shown, and wherein:

FIG. 1 is a plan view of an article caser apparatus of the invention;

FIG. 2 is a side elevation of the apparatus of FIG. 1;

FIG. 3 is an enlarged plan view of the case processing portion, or lower half of the apparatus of FIG. 1;

FIG. 4 is a side elevation of the apparatus of FIG. 3;

FIG. 5 is an enlarged end elevation of the apparatus of FIG. 1 taken at the case discharge end thereof;

FIG. 7 is an enlarged detail view, partially shown in vertical section, of a control switch and associated means forming a part of the grid mechanism shown in FIG. 6;

FIG. 8 is a view similar to FIG. 7 but with some parts removed and with the control switch and associated means shown in FIG. 7 in a switch opening position;

FIG. 9 is an enlarged fragmentary side elevation of a control cam and stop roller assembly forming a portion of the grid and case filling apparatus shown in FIG. 6;

FIG. 10 is an enlarged fragmentary side elevation of the case positioning platform and support means therefor of the apparatus of FIG. 2;

FIG. 11 is a fragmentary horizontal section taken on line 11—11 of FIG. 10;

FIG. 12 is a plan view of an article receiving grid and associated means;

FIG. 13 is a vertical section taken on line 13—13 of FIG. 12 showing the action for article retaining and article release in the grid mechanism of FIG. 12;

FIG. 14 is a vertical section on line 14—14 of FIG. 12 through the grid mechanism showing the bottle separation movement means and the control means therefor;

FIG. 15 is a fragmentary semi-diagrammatic view of a portion of the grid and partition means therein with articles shown as initially received in the grid;

FIG. 16 is a view similar to FIG. 15 only with the pusher or separator arms moved over into contact with the abutted articles on the grid;

FIG. 17 is a further view similar to FIG. 15 wherein the stop roller and articles have been moved longitudinally as a unit and the stop roller has been moved independently of the remaining portions of the grid assembly;

FIG. 18 is an enlarged plan view of the sub-frame of the apparatus and associated members;

FIG. 19 is a fragmentary side elevation of the article clamping and article speed-up means of the apparatus as shown in FIG. 18;

FIG. 20 is a fragmentary front elevation of the clamp members taken on line 20—20 of FIG. 19;

FIG. 23 is a fragmentary plan taken on line 23—23 of FIG. 7; and

FIG. 24 is a schematic wiring diagram of the controls and electric circuit means of the apparatus of FIG. 1.

When referring to corresponding members shown in the drawings and referred to in the specification, corresponding numerals are shown to facilitate comparison therebetween.

Figure 6:
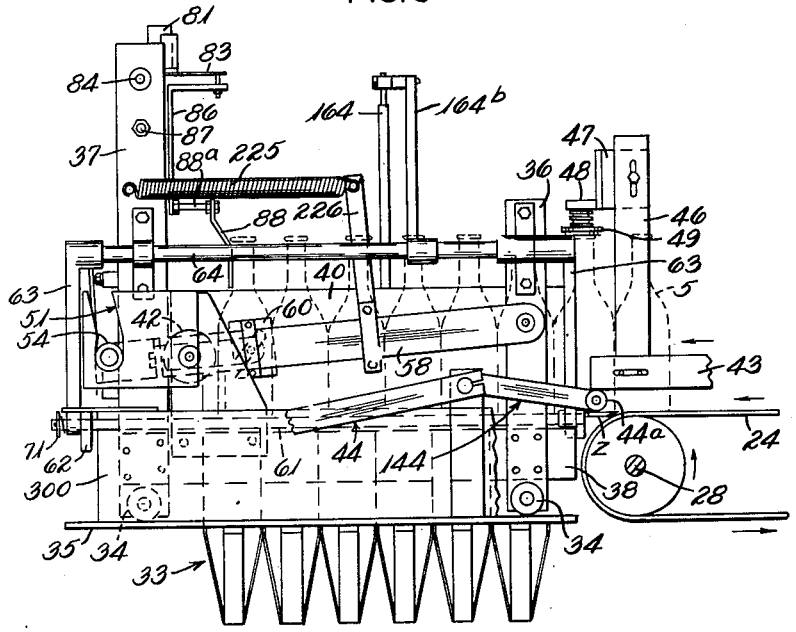
FIG. 6 is an enlarged side elevation of the case filling grid and associated mechanism portion comprising the downstream end of the upper portion of the apparatus of FIG. 1.

It will be understood that the word "article" is used broadly in the present application and that any desired types of articles including bottles, cans, jars, or similar packages can be processed in apparatus of the invention.

In general, the present invention relates to apparatus for packing bottles or other articles into cases therefor, which apparatus comprises a frame, case support means on the frame to position cases for article filling action, a sub-frame, conveyor means on the sub-frame for moving articles therealong while maintaining them in parallel rows, means pivotally positioning the sub-frame and conveyor means at the upstream end thereof above the case support and conveyor meons, means engaging the sub-frame to control the position thereof and to move the conveyor means vertically towards and away from the case support and conveyor means, a case filling grid carried by the sub-frame to receive articles from the conveyor means and position them in case filling arrangement, means operatively carried by the sub-frame to prevent the next articles on the conveyor means from moving into the grid from moving thereinto after the grid is filled, control means operatively connected to the frame and engaging the grid to move it longitudinally from said conveyor means on movement of the sub-frame towards the case support and conveyor means, and means normally supporting articles in the grid and operatively connected to the frame to release such articles on further movement of the sub-frame towards the case support and conveyor means. The apparatus also includes control means to provide regulated automatic operation of the apparatus dependent upon proper supply of articles and cases thereto.

Attention now is particularly directed to the details of the structure shown in the drawings, and an article caser apparatus of the invention is indicated as a whole by the numeral 1. This article caser 1 includes a main frame 2 that has a sub-frame 3 positioned thereabove for pivotal motion with relation to the main frame 2, as hereinafter described in detail.

In general, apparatus for processing, positioning and moving cases 4 is provided on the main frame 2, whereas the apparatus for positioning, moving and controlling the position of articles, such as bottles 5, is provided on or in association with the sub-frame 3.

*Case Moving Means*

FIGS. 3 and 4 of the drawings best show that an endless driven conveyor 6 can be suitably journalled on the upstream end or portion of the main frame 2, and any suitable means (not shown) may be provided for supplying a flow of cases 4 to this endless conveyor 6 that moves these cases 4 into the article caser 1 for filling action therein. A support member, or plate 7 is positioned axially aligned with but spaced from the discharge end of the endless conveyor 6, and a conveyor including a pair of side chains 8, 8 and cross bars 9 is positioned on the main frame 2 to move such cross bars 9 along the support plate 7 above and spaced from the upper surface thereof to move the cases 4 longitudinally of the article caser 1 to position individual cases 4 on a case support plate 10, intermittently, for case filling action, as hereinafter described. This conveyor made from the side chains 8 and cross bars 9 connects to a shaft 11, suitably journalled on the main frame 2, by means of a conventional sprocket, or the like. The shaft 11 normally has a second sprocket 12 thereon that has a drive chain 13 connecting thereto and extending to and engaging a sprocket on a driven shaft 14 journalled in and extending transversely of the main frame 2 for apparatus drive and control functions as hereinafter described.

A spring finger 15 extends upwardly through a slot in the support plate 7 and is depressed by any cases moving over, or positioned upon it to close a control switch 16 with which the spring finger 15 is associated. The control switch 16 is connected in the control circuit for the motor for operating the article caser 1, as hereinafter described, or for controlling any desired portion thereof, such as the sub-frame 3 and associated means.

A U-shaped case control yoke 6a is provided at the discharge end of the conveyor 6 to regulate feed of cases 4 to the support 7. Such yoke 6a is raised and lowered by a control cam (not shown) on a member, such as a shaft 6b, journalled on the frame 2 and driven from the shaft 14 by a control chain 6c connected between such shafts 14 and 6b.

To feed the relatively light cases 4 onto the support plate 7 from the infeed conveyor 6, a driven endless belt 7a is journalled, or positioned on one side of the frame 2 and extends between the conveyor 6 and support plate 7. Such belt 7a is located on the frame to engage the sides of a case 4 as it is moved to the downstream end of the conveyor 6. Idler rolls 7b are journalled adjacent the opposite side of the frame 2 and are resiliently urged laterally inwardly thereof by conventional means (not shown) so that the idler rolls 7b engage one side of the case 4 and force it over against the belt 7a. The belt 7a positively and rapidly moves the cases 4 over the gap between the support plate 7 and the conveyor 6 for engagement by the cross bars 9 of the second conveyor.

Article Feeding and Conveying Means

FIGS. 1 and 2 best show that the upstream end of the sub-frame 3 is pivotally secured to and carried by the main frame 2 by means of a pair of brackets 17 pivotally supporting the sub-frame 3 at their upper ends and fixedly secured to the main frame 2 in a conventional manner at their other ends. The sub-frame 3 is further supported adjacent its downstream end by means of a pair of cams 18, 18 secured to the drive shaft 14 adjacent the ends thereof and externally of the main frame 2 by means of cam followers 19 that engage the periphery of the cams 18, 18 to have rolling engagement with the periphery of these cams. These cam followers 19 are secured to and are journalled on suitable supports 20 fixed to the sub-frame and extending downwardly therefrom. Hence, by properly shaping the cams 18, 18, the sub-frame 3 moves down towards the main frame 2 once for each revolution of the control cams 18 to facilitate case filling action, as hereinafter described.

The sub-frame 3 has a plurality of parallel sheets or partitions 21 positioned above the sub-frame 3 and in parallel relationship to each other by means such as overhead supports 22 secured to the sub-frame 3 and extending upwardly and transversely thereof to bridge thereover. Any desired type of a connector member 23 is laterally adjustably carried by each of the supports 22 and extends downwardly therefrom for engagement with the partitions 21 to position them above the sub-frame 3 as indicated. Any desired type of a conveyor 24 is operatively carried by the sub-frame 3 to receive the bottles 5 fed thereto to maintain such bottles 5 in a plurality of aligned streams moving along intermediate the paths defined by the adjacent partitions 21. In this instance, four parallel paths for article feeding action are provided on the sub-frame 3. Any conventional means can be provided for supplying bottles to the upstream end of the sub-frame 3 to deposit them on the conveyor 24 which in turn maintains the bottles in a plurality of spaced streams and moves them longitudinally for case filling action. These bottles could even be manually supplied, if desired, but normally some automatic feeding mechanism is associated with the sub-frame 3 to deposit streams of bottles onto the conveyor 24. An electric motor 25 is carried by the sub-frame 3 above the conveyor 24 and its chain connects to a member, such as a sprocket 26, by means of a drive chain 27 for driving such sprocket and a shaft 28, for example, to which the sprocket 26 is secured by a magnetic clutch 128, or equivalent member. One portion of the conveyor 24 is supported on the sub-frame 3 through the shaft 28 for driving such conveyor 24 and moving the bottles 5 rapidly towards the discharge end of the conveyor for case filling action.

In order to safely stop bottles and position them for case filling action, a slow speed drive also is provided for the conveyor 24 as another feature of the invention. To provide such action, the shaft 28 has a sprocket 26a, FIG. 1, secured to another portion thereof and a chain 26b connects the shaft 28 to another shaft 28a that is suitably journalled on the sub-frame 3. The shaft 28a is driven by the motor 25, and connects to and drives the chain 26b, but the shaft 28a has a slower rate of rotation than the drive of the shaft 28 through the magnetic clutch 128. The chain 26b connects to the shaft 28a through an over-running clutch 28b so that if the magnetic clutch 128 is actuated and drives the shaft 28, the clutch 28b will not engage to drive the chain 26b but will only engage if the magnetic clutch 128 is released and the slower drive of the over-running clutch 28b takes over. The control of the magnetic clutch is regulated so that it moves the downstream group of bottles rapidly towards a case filling position, but releases and causes the slower speed drive to take over for continuous but slower movement of the bottles as moved to their stopped, substantially case filling positions on the grid, as hereinafter described. Of course, the apparatus is set so that it will provide as many streams, or rows of the articles, or bottles 5 as is required for filling a given case 4. The sub-frame 3 is also partially supported on the main frame 2 by means of control bars 29, one of which is secured to the sub-frame 3 adjacent each side of the upstream end thereof. These control bars 29 extend downwardly from the sub-frame and may slidably engage an aperture in a channel or equivalent member 30 secured to the main frame 2 to position the control bars. The control bars 29 are each telescoped through a coil spring 31 that rests on or is otherwise carried by the frame 2. Each of the control bars 29 has a suitable load transfer member, such as a washer 32, secured thereto and engaging the upper end of each of the coil springs 31 to compress the coil springs 31 as the sub-frame is lowered to transfer some of the weight of the sub-frame to the main frame to facilitate controlled movement of the sub-frame.

Case Filling Grid

A case filling grid, indicated as a whole by the numeral 33, FIGS. 5, 6, 12 and 13, is movably supported on the sub-frame 3 at the downstream end thereof beyond the end of the conveyor 24, and such grid is carried on or is supported by rollers 34 at the ends thereof engaging supports or plates 35 suitably secured to a pair of side extension members 300 secured to and extending longitudinally beyond the sub-frame 3. The plates 35 extend laterally inwardly from the extension members 300, as indicated in FIG. 5. The case filling grid 33 includes upstream corner posts 36, 36 and downstream corner posts 37, 37 and an open centered frame 38 to which the corner posts 36 and 37 are secured. A grid sub-frame 39, made of longitudinally and transversely extending spaced plates, or members 39a, forms a series of openings corresponding to the size and position of the articles 5 required for case filling action, and is secured to and extends across the open center of the frame 38 for the case filling grid 33. The driven endless conveyor 24 feeds a line of the bottles 5 towards such case filling grid 33, and usually some type of a cover plate Z, FIG. 6, is provided to extend transversely between the extension members 300 to bridge the connection between the case filling grid 33 and the end of the conveyor 24 where it starts to turn downwardly around the support means, or sprockets provided therefor. The case filling grid 33 includes a plurality of parallel partitions 40 carried by the upper portions of the sub-frame 39 and extending longitudinally and upwardly thereof at the upper section of the grid. The grid sub-frame 39 also supports a suitable shoehorn grid, or assembly at the lower portion thereof below each of the openings in the sub-frame 39, each of which shoehorn assemblies comprises a plurality of spring fingers 41, secured to opposed parts of the sub-frame 39 and extending downwardly therefrom. Usually two sets of opposed spring fingers 41 are provided in each article receiving section of the grid sub-frame so that the article, when desired, can be dropped from the grid 33 to move downwardly through the sets of spring fingers 41 for safe passage therethrough into one of the cases 4, as hereinafter described. The grid 33 is adapted to aid in the final positioning of articles passing therethrough in case filling groups by V-shaped notches 39b in the upper surfaces of the transversely extending members 39a of the grid sub-frame which move the articles 5 slightly into exact register with openings in the sub-frame 39 as the articles move into and through the sub-frame.

As articles, such as a plurality of streams of the bottles 5, are moved into the grid 33 intermediate the sets of the partitions 40 provided therein, the leading bottles 5 in each row or stream of bottles will be stopped by abutting against a suitable member, such as a roller 42, FIGS. 7 and 15, extending transversely of the grid 33 at the discharge end thereof and preferably having a suitable resilient coating material, such as rubber, or equivalent material provided thereon. The bottles 5 and the roller 42 are supported in the grid 33 by means described hereinafter in more detail.

The sub-frame 3 and the extension members 300 may be considered to be frame means, or grid positioning means on which the grid 33 is operatively positioned.

It is an important feature of the present invention that an action is effected on the streams of bottles 5 being fed into the case filling grid 33, upon downward movement of the sub-frame 3 towards the main frame 2 for case filling action so that further feed of additional bottles towards the case filling grid 33 is prevented, when the desired number of bottles 5 have been received in the case filling grid 33 for case filling action. Hence, a lever 43, FIG. 19, is pivotally supported on each of a pair of posts 136, 136 secured to the sub-frame 3 and extending upwardly therefrom at the upstream ends of the levers 43. The downstream ends of these levers 43 are operatively connected to an arm 144 of what may be considered a bell crank lever 44 by a roll 44a. The bell crank lever 44 is secured to a rod, or member journalled on the sub-frame 3 and it has its other arm 44b extending downstream to engage a control bracket or stop 145 by a roll 145a. The control bracket 145 is suitably secured to an upright, or stanchion 45 secured to the frame 2 and extending upwardly therefrom. The bell crank lever 44 is arranged so that on upward movement of the sub-frame 3 and associated means from their article drop position, the control bracket 145 contacts the arm 44b and moves the levers 43 upwardly through the arms 144 for a purpose to be hereinafter described. On downward movement of the sub-frame 3, the bell crank levers 44 (as one is provided adjacent each lateral margin of the sub-frame) free the levers 43 for downward movement for an article clamp action. The downstream end portions of the levers 43 are secured together by uprights 46 that have a cross bar 47 secured thereto and extending therebetween. The cross bar 47 has a plurality of clamp bars 48 engaged therewith for lateral adjustment in a slot 47a therein, and carrying clamp heads 49, of any suitable shape, at their lower ends. Coil springs 50 telescopically engage the clamp bars or plates 48 and resiliently urge such clamp heads 49 downwardly from the cross bar 47 so that upwardly extending forces applied to the clamp heads 49 can force them up towards the cross bar 47. The clamp heads 49 are set to engage the tops of bottles 5. These clamp bars and clamp heads 49 are so positioned by the cross bar 47 that proper upward movement of the downstream ends of the levers 43 will force the clamp heads 49 out of engagement with the upper ends of the bottles 5 awaiting feed into the case filling grid 33 to permit further movement of such bottles. The levers 43 are continually urged downwardly for engaging the clamp heads 49 with articles 5 on the conveyor 24 by coil springs 150 positioned in retaining cylinders 150a and bearing downwardly on upper portions of the levers 43. The cylinders 150a are positioned in supports 3a secured to the sub-frame 3 and extending upwardly therefrom. The cross bar 47 is adjustable vertically on the uprights 46 to position the clamp heads 49 for pressure engagement, from the top, with the articles, such as the bottles 5, on the conveyor 24 to prevent forward movement thereof. The coil springs 150, through the lever, cross bar 47 and associated means exert a suitable pressure on the bottles 5 to hold them in position and prevent further movement, or feed of bottles towards the case filling grid 33 while bottles therein can be positioned in one of the cases 4, as downward movement of the sub-frame 3 releases the bell crank lever 44.

As another important feature in the case filling action of the article caser 1 of the invention, the entire unit or group of bottles 5 received in a case filling grid 33 and the grid itself are moved longitudinally a short distance to separate them from the remaining bottles awaiting case filling action, and to better position such group of bottles 5 for case filling action. Initially all articles in any one row in the grid 33 are all abutted, as shown in FIGS. 15 and 16. Movement of the bottles 5 and grid longitudinally is provided in the apparatus only after the clamping action has been exerted on the bottles 5 awaiting feed to the grid 33. This movement is occasioned by means of a control cam, or cam slot 51, FIG. 9, operatively formed in a cam plate 52 secured to the frame extension 300 at the downstream end thereof. The cam 51 is shown to include a member 53 removably carried by the cam plate 52 and forming a movement control surface 53a of the cam. A cross bar 57 is operatively associated with the downstream corner posts 37 and thus with the frame 38 to extend transversely of the case filling grid 33 and laterally beyond the grid frame 38 for limited vertical and longitudinal movement in the grid 33. The cross bar 57 engages the cams 51 by rollers, or cam followers 54 journalled on the ends of the cross bar. As the cam plate 52 is secured to the extension 300 forming part of the sub-frame 3 and the rollers 54 and cross bar 57 can move upwardly and rearwardly of the grid upon movement of the sub-frame 3 relative to the frame 2. Such action can be used to move the grid 33 downstream a short distance. In this instance, the stops or control brackets 145, or members secured thereto, engage the rollers 54 or means associated therewith to produce the cam controlled movement of the cross bar 57 and thus of the grid sub-frame 3 and articles received therein. Therefore relative movement of the sub-frame towards the main frame will lift the cross bar 57 to produce longitudinal movement of these case filling grid and articles received thereon on the extension 300.

FIGS. 6 and 7 show that the cross bar 57 is positioned on the downstream side of the downstream corner posts 37 of the case filling grid frame 33. Levers 58 are pivotally secured to the upstream corner posts 36 and extend along the sides of the grid to the downstream end thereof to operatively engage and position the cross bar 57 so that another important control action for articles received in the grid is provided through the levers 58 and associated means. FIG. 9 shows that a bracket 59 is longitudinally adjustably secured to the grid frame 38 on each side of the grid 33. An upper support arm, or member 59a is pivotally secured to each of the brackets 59 and extends longitudinally of the grid. The roller 42 is secured to and extends between the support arms 59a on opposite sides of the grid 33 at the downstream end thereof. A cam plate 60, having a downwardly and rearwardly extending cam slot 60a therein, is secured to each of the levers 58 for moving the roller 42 downstream as the levers 58 are raised. The support arms 59a, at their upstream ends, postion cam followers or pins 59c that are received in the cam slots 60a to move the roller 42 and downstream ends of the support arms 59a downwardly and rearwardly of the grid 33, to provide additional space for movement of some of the articles 5 a short distance for more accurate case filling positioning thereof, upon upward movement of the levers 58, as hereinafter described.

The levers 58 are normally pulled or urged downwardly by gravity and by the action of coil springs 225 extending between the downstream corner posts 37 and arms 226 secured to each of the levers 58 and extending upwardly therefrom. A cross bar 227 is also shown connecting the support arms 59a together for unitary action thereof.

The bottles 5 received in the case filling grid 33 are retained therein by longitudinally extending retainer bars 61 that extend the length of the case filling grid. These retainer bars 61, as shown in FIG. 13, normally are positioned substantially at the center of the rows provided in the grid by the sets of partitions 40 but with the retainer bars 61 being adjacent the lower edges of the partitions and above the sub-frame 39a, and having article retaining and article release positions. End bars 62, which engage and position the retainer bars 61, extend transversely of the case filling grid 33 at the upstream and downstream ends thereof. These end bars 62 are positioned by means of sets of vertically extending links 63, FIGS. 5 and 7, at both ends of the grid. The links 63 are secured at their upper ends to support shafts 64, one of which is provided adjacent each lateral margin of the case filling grid 33 and extending the length thereof. Such shafts 64 are suitably journalled on and extend between the corner posts of the grid so that the links 63 can be moved arcuately to move the end bars and retainer bars 61 transversely of the case filling grid when desired.

The required amount of lateral movement for the end bars 62 and thus of the retainer bars 61 to move them from bottle retaining to bottle release positions is provided, as a feature of the invention, by means of the relative movement between the sub-frame 3 and members carried thereby and the main frame 2. To this end, a control arm 65, as shown in FIG. 5, is secured to one of the shafts 64 and extends laterally outwardly of the grid therefrom. The free end of the control arm 65 extends to a position adjacent the upright or support 45 to contact a resilient vertically movable stop 66 on the upright. The stop 66 and arm 65 are so arranged that upon upward movement of the sub-frame 3 and associated members carried thereby and when the sub-frame 3 is at its upper position, the control arm 65 is swung downwardly through a desired arc to turn the shaft 64 through a similar arc and move the end bars 62 by the links 63 to their operative positions for the retainer bars 61. The action of the links 63 and the retainer bars 61 also is controlled by a spring 67 that extends between the links 63. The spring 67 connects to the link 63 on the shaft 64 to which the control arm 65 is secured adjacent the shaft 64 for a small lever length and to the other link 63 at a point near the cross bar 62 for a long lever length, as shown in FIG. 5, so that the links 63 and associated means are continually urged towards a position in which the retainer bars 61 are substantially vertically aligned with or are under the partitions 40. When the retainer bars 61 are moved to their article release positions, as indicated in FIG. 13, the bottles 5 will drop from the grid through the sets of resilient fingers 41 carried therebelow to be safely deposited in a case 4 carried on the case support plate 10 mounted on the main frame 2. FIG. 13 best brings out the fact that the partitions 40 provided in the case filling grid, in effect, have recessed or reduced thickness lower ends, as indicated at 68, which recesses are of such size as to receive the retainer bars 61 snugly therein and leave no protruding or exposed sections of the retainer bars so that the bottles 5 are free to fall through the grid as soon as the retainer bars 61 are moved into their inoperative positions. The action of the control arm 65, stop 66 and spring 67 is such that the retainer bars 61 are moved over to their release positions as the sub-frame 3 and means thereon are lowered down towards the frame 2, as hereinafter explained in detail.

Figures 21, 22:
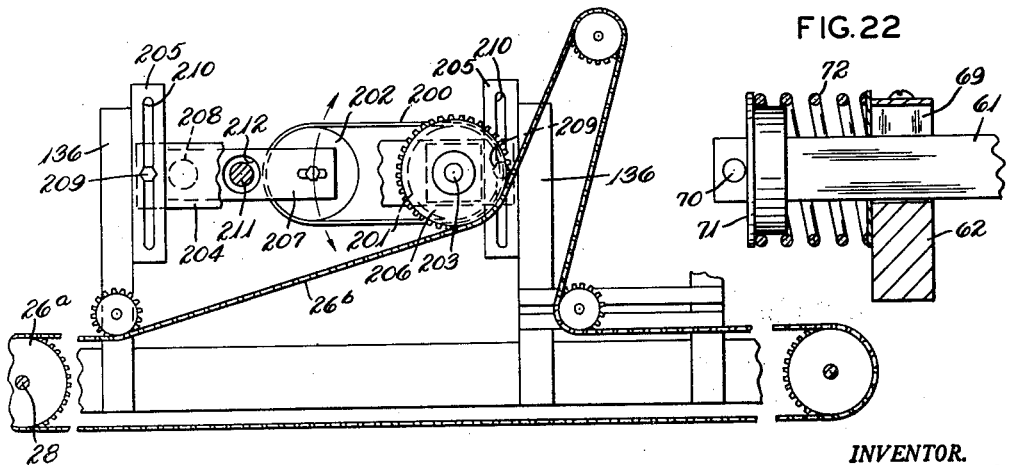
FIG. 21 is a fragmentary side elevation of a portion of the sub-frame of the apparatus of FIG. 1 and particularly showing the article speeder, or article or positive article feeding means of the apparatus.
FIG. 22 is a fragmentary vertical section taken on line 22—22 of FIG. 12.

FIG. 22 of the drawings best shows that the retainer bars 61 are positioned in slots 69 formed in the end bars 62 in a quickly releasable manner. The downstream ends of the retainer bars 61 normally extend beyond the downstream end bar 62 and are secured there against by members, such as cotter pins 70, that engage the retainer bars 61 and also engage suitable lock washers 71 carried by the retainer bars 61 and urged against the pins 70 by means, such as springs 72, compressed between the end bars 62 and the pins 70. Any quick release means may secure the upstream ends of the retainer bars 61 to a frame end bar 62.

The return springs 225 connect the cross bar 57, through the levers 58, to a part of the grid frame so that when the upwardly directed forces exerted on the roller 42 and associated means are removed by the subframe 3 moving upwardly again in the apparatus, at that time, the roller 42 is brought down into its operative position, as indicated in FIGS. 5 and 9 of the drawings, and the return springs 225 also move the grid 33 to its forwardmost position on the frame extension 300.

Initially the articles or bottles 5 are fed into the grid 33 in abutting contact for controlled, rapid feeding of the articles. As the longitudinally spaced centers of the openings in the grid sub-frame 39 are spaced further apart than the width of the bottles, the abutted bottles in the grid 33 hence are not located in proper spaced relation for most convenient, safe, and rapid deposit or drop from the grid into the case. For spacing action, a plurality of pushers, or spacer arms 164 are secured to transversely spaced portions of a bar 164a secured to and extending between arms 164b caried by and extending upwardly from the shafts 64, FIGS. 6 and 14. One spacer arm 164 would be used with each row of the grid 33 which has, for example, six longitudinally aligned bottles in a row. The spacer arms 164 are adapted to be moved, on arcuate movement of their support shafts 64, to positions between the third and fourth bottles from the upstream end of the grid to move the first three bottles in the row upstream a short distance, and to move the fourth, fifth and sixth bottles downstream a short distance. As shown in FIG. 17, the second and fifth bottles are positioned by the grid 33 for accurate and rapid deposit in proper portions of the case 4, as determined by the openings in the grid. Arcuate movement of the support shafts 64 are produced by the resilient action of the spring 67 on the links 63, as released by the stop 66. The pusher or spacer arms 164 may limit arcuate movement of the shafts 64 by engaging the bottles as shown in FIG. 16. As soon as the stop roller 42 is moved longitudinally of the grid and the grid itself has moved, the links 63 and shafts 64 would complete their arcuate movements. However, the spacer arms 164 are moved into contact with bottles on the grid shortly after the grid is filled and the resilient forces on the spacer arms keep bottles on the grid 33 snugly abutted to minimize tendency of the bottles on the grid to knock against each other and break. On continued downward movement of the sub-frame 3 and associated means, the control arm 65 and associated means will cause arcuate inward movement of the spacer arms 164 to separate the articles in the grid for more accurate positioning of bottles over grid sub-frame openings. This movement of the spacer arms 164, the shafts 64 and hence that of the retainer bars 61, is controlled in the apparatus 1 to occur after the grid 33 and roller 42 have been moved to free the bottles 5 for the desired separation movement of the articles, and the retainer bars 61 cannot move to a release position until the separation action is secured by the full arcuate movement of the shafts 64.

Another important feature of the invention is that the case support platform 10, FIG. 10, is adapted to be moved upwardly towards the sub-frame 3 at the same time that the sub-frame 3 is moving downwardly with a number of bottles 5 provided in the case filling grid 33 so as to fill the case. This action of the case support plate 10 is provided by means of a pair of connector arms 75 secured to the sub-frame 3 and extending downwardly therefrom. Such connector arms pivotally engage ends of levers 76, 76 one of which is positioned adjacent each side of the main frame 2 and suitably journalled thereon intermediate the ends of the levers. The opposite ends of the levers 76 are pivotally secured to a connector 76a that extends downwardly from a bracket 77 forming part of the mounting assembly of the case support plate 10 in the main frame 2 for reciprocating vertical movement therein.

The case support plate 10 has a cross plate 78 below it and suitably secured thereto. End slides 79 are carried by the cross plate 78 and protrude laterally therefrom to be slidably positioned intermediate pairs of guide bars 80 secured to the frame 2 at each side thereof. The case support plate 10 is hence positioned to be raised or lowered on the frame 2 by the connector arms 75 as the sub-frame 3 is lowered, or raised, respectively.

*Feed of Articles to Grid and Controls Therefor*

FIGS. 7 and 8 best show certain controls used for regulating feed of articles through the apparatus for case filling action. Thus adjacent the downstream end of each row defined by adjacent partitions 40 associated with the grid means, an electric control switch 81 and individual row cocking assemblies are provided. Each one of these coordinates with and is actuated by end articles in the rows of articles being collected in the grid member to control the setting of the switch 81 secured to, for example, an upper portion of one of the downstream corner posts 37 on the grid frame unit. The switch 81 has an operating pin or arm 82 extending therefrom for control of electric contact means (not shown) within the switch 81 to open or close electric circuit means connecting to the switch 81, as desired. In this instance, the switch 81 is opened when the pin 82 is forced inwardly of the switch and such switch has a normally closed position. A control plate 83 is secured to and positioned by a carrier shaft 84 journalled on and extending between the corner posts 37 for pivotal movement. The control plate 83 is located immediately adjacent and below the switch 81 for moving the pin 82 to its inner or contact opening position. The control plate 83 is supported by means of a plurality of studs 85, each one of which is vertically adjustably supported by an individual support bracket 86. A plurality of these support brackets 86, which form parts of the individual cocking assemblies corresponding to the number of rows of articles being fed into the case filling grid 33, are carried by a rod or shaft 87 that extends between and is journalled on the corner posts 37. Each of the brackets 86 has a contact arm 88 secured thereto by extensions 88a and positioned forwardly thereof and extending downwardly therefrom. These contact arms 88 are positioned to be struck by articles, such as the bottles, moving along between the rows of partitions 40. The contact arms 88 are struck and forced to move slightly backwardly to carry the brackets 86 therewith when contacted by the bottles fed to the grid assembly.

The contact arms 88 are resiliently held in their forwardmost, or operative positions by members, such as vertically extending, control pins 89, operatively secured to each of the brackets 86. These control pins are split into two sections that are resiliently retained in association with each other by coil springs 90 telescoped therearound. The lower ends of the control pins 89 are pointed at 91 and are seated against suitable means such as blocks 92a on a stop bar or rod assembly 92, but with the two sections of the control pins 89 being movable with relation to each other by a snap action from forwardly angled to rearwardly angularly disposed relationships, as shown in FIGS. 7 and 8 of the drawings. Thus when these individual controls are cocked, or moved to operative positions, all of the control pins 89 are moved to their vertically forwardly protruding positions, as shown in FIG. 7, and this causes the individual brackets 86 to be moved upwardly so that the studs 85 all contact the control plate 83 and each and every one of the assemblies operatively retains the plate 83 in engagement with the pin 82 to maintain the switch 81 open. However, as articles strike the individual contact arms 88 in each of the rows of articles fed into the case filling grid 33, the rows then individually move the contact arms 88 and the brackets 86 to a released, or lowered position so that when all brackets 86 are released, they no longer hold the control plate 83 up to engage the pin 82 and the switch, for example, is closed. The circuit connected to the control switch 81 may connect, for example, in the circuit controlling the main drive so that unless articles are present in the grid 33 for case filling action, the apparatus will be stopped. And, the apparatus can start again as soon as articles move to and actuate the switch 81.

In order to reset the individual controls or cocking units associated with each one of the rows of articles fed into the grid means for case filling action, the cross bar 57, that is associated with the roller 42, has means thereon for such action. The cross bar 57 has an upwardly extending arm 93 secured thereto to aid in such action and the cross bar 57 is moved upwardly in the case filling grid assembly during each cycle of operation. The recocking of the switch control means is effected by a plate 193 that has an upper end slot 194 provided therein engaging the rod 87. The plate 193 has a lower end slot 195 engaging a control bar 196 suitably positioned below and slightly downstream from the rod 87, as by links 197 journalled on the rod 87. As the cross bar 57 is lifted in the cycle of operation, the arm 93 engages an inclined lower end of the plate 193 and lifts it vertically a short distance, which movement also carries the plate 193 upstream a short distance to ultimately release the plate 193. When released, the plate 193 drops down in front of the arm 93. Then as the cross bar 57 is moved downwardly of the grid corner post 37 in the cycle of operation, a boss or rib 93a on the arm 93 engages a trailing edge projection 198 on the plate 193 to move it upstream. Upstream movement of the plate 193 carries the control bar 196 forwardly into contact with the control pins 89 to move them into their forwardly (upstream) extending, or cocked positions (FIG. 7) at which positions the switch 81, for example, is open. Suitable means, not shown, retain the plate 193 against lateral movement on the rod 87 and control bar 196. Feed of articles into the case filling grid normally occurs as soon as the levers 43 are released by upward movement of the sub-frame 3. Such action occurs very rapidly, it will be understood, when the apparatus of the invention is filling, for example, 30 or more cases a minute. Obviously the action of the control bar 196 in resetting the control pins 89 is not completed until the previous articles received on the case filling grid have been dropped therefrom for case filling action, and the sub-frame 3 has completed its downward movement and is at least ready to start to move upwardly again in the apparatus.

A switch 96, FIG. 1, is provided in the upstream area of the bottle supply portion of the apparatus and may, for example, be carried by one of the partitions 21. The switch 96, as hereinafter explained, may control the case filling action in the apparatus to aid in insuring that a sufficient backlog of articles is present on the sub-frame conveyor 24 for best functioning of the apparatus. Any suitable transfer or discharge conveyor 301 may be provided to receive filled cases from the case support plate 10.

*Article Acceleration Means*

Reference now is particularly directed to FIGS. 18 and 21 of the drawings wherein means are shown for aiding or insuring positive and effective acceleration of articles immovably held on the continually driven upper conveyor 24. Normally the upper conveyor 24 is driven at all times, although it is driven at a slower rate of speed when the brake means (shown in FIG. 19) are applied to stop further flow of articles to the case filling grid 33 of the invention. However, when these brake means are released, it is desirable that the articles awaiting feed onto the grid 33 be immediately picked up and moved at the full speed of the conveyor 24 when moving into the grid for case filling action. Rapid acceleration of articles on the conveyor 24 with the conveyor is provided by means of a plurality of endless belts 200 that are journalled on and positioned by sets of sheaves, or pulleys 201 and 202. The pulleys 201 are carried by a drive shaft 203 journalled in support plates 204 vertically adjustably carried by and extending between uprights 205 secured to each lateral portion of the sub-frame 3 and the uprights 136. The shaft 203 has a sprocket 206 on the end thereof that engages the drive chain 26b carried by the sub-frame 3, and described hereinbefore, so that the belts 200 will be continually driven as long as the conveyor 24 is operating. The belts 200 are positioned for automatic vertical adjustment at the pulleys 202 which are journalled on suitable members carried by individual support arms 207 pivotally carried by a support shaft, or rod 208. Such support rod 208 is secured to and extends between the support plates 204 on the lateral margins of the sub-frame 3. Bolts or cap screws 209 secure the support plates 204 to vertically extending slots 210 provided in members secured to the uprights 136 and 205. Thus by adjusting the vertical positions of the support plates 204, the belts 200 can be caused to engage the upper surfaces of the articles received on the conveyor 24 and exert downward pressure thereon of any desired force so that the articles are tightly engaged with the conveyor and will be urged to move along therewith at the speed of the conveyor whenever forward motion of the articles is permitted. A rod 211 also is secured to and extends between the support plates 204 to limit pivtal movement of the support arms 207. The rod 211 extends loosely through a guide aperture 212 provided in each of the support arms 207.

Apparatus Controls and Circuits

In the base portion of the apparatus of the invention, a control shaft 97 is suitably journalled, and is shown in FIG. 3. The control shaft 97 is shown to be driven by means of a drive chain 98 that connects to the control shaft 97 and to suitable means on the drive shaft 14 so that the control shaft 97 will move through one revolution for each case filling cycle of the apparatus 1. The control shaft 97, as shown in FIGS. 3 and 4, has a plurality, usually four, of cam plates, or equivalent members 99, 100, 101 and 102 secured thereto. These cam plates 99 through 102 each connect to and control individual normally closed switches 103, 104, 105 and 106, respectively, through a control arm on each of these switches engaging one of the cam plates for temporary switch opening, or other desired control action thereby. The cam plates and the switches are so correlated with each other that they only open, or actuate the switches 103 through 106 at one small arc of rotation of the control shaft 97. Hence the switches 103, 104 and 106 can be and are connected in the control circuit in interconnected relation to other switches or controls to insure proper functioning of the article caser apparatus at the desired times determined by the position of rotation of the control shaft 97 in relation to the various steps of an operative cycle of the apparatus.

Referring now to the diagrammatic wiring diagram of FIG. 24, where switches are shown in their normal positions, power is supplied to the apparatus of the invention through input leads 107, 108 and 109 to furnish power to a main drive motor 110 usually carried by the frame 2 and suitably connected to and driving the drive shaft 14 from which the major control and drive operations in the apparatus 1 are taken. The drive motor 25 for the conveyor 24 is supplied with power from the input leads through the control circuit as hereinafter described.

A transformer 111 is connected to the power leads 107 and 109 to provide electrical power at a desired voltage to leads 112 and 113 that form the power leads for the electrical controls for the apparatus of the invention.

One switch 114 is shown on the wiring diagram in FIG. 24 and is not shown in the other drawings. The switch 114 is carried by the yoke 6a and is closed by contact with one of the cases 4 being moved forwardly into the apparatus 1 on the conveyor 6 to engage the end yoke 6b prior to being moved further into the apparatus.

Each of the switches 16, 96 and 114 is operatively interlocked with one of the control switches 104, 106 and 103, respectively, by being connected in parallel therewith, with all of such switches 103, 104 and 106 being normally closed switches and are open for a short portion of the rotation of the control shaft 97 correlated to the time of closing or actuation of the switches 16, 96 and 114 by proper functioning in the cycle of operation of the article caser apparatus 1. The interlock action provided by these paired switches and the control action thereof is such that the drive motors of the apparatus will either be shut off or their operation will be suspended should the control switches 16, 96 and 114 not be actuated at the proper portion of the operative cycle of the apparatus. The control cam plate 101 and its switch 105 connect operatively to the magnetic clutch 128 and are so set up on the control shaft 97 as to open the circuit to the magnetic clutch at the desired time in the operative cycle to slow down feed of bottles 5 to the case filling grid immediately prior to the filling of the grid by the bottles.

The apparatus is started by closing a start switch 115 and this operates the coil of a control relay 116 to close the power supply circuit to a starter M1 for the main drive motor 110 through normally closed switches 103 and 106 and a set of contacts 116a closed by actuation of the relay 116 controlled and closed by actuation of the relay 116 lock in the actuation of the relay by switches 104 and 104a to normally maintain such relay energized continuously. The switch 104a, if used, is positioned on the case support plate 10 and is closed by a case properly positioned thereon. The second drive motor 25 (for the conveyor 24) is started by a starter switch 120 being closed that energizes the control coil of a motor starter M2 operatively connected between the leads 112 and 113. The starters M1 and M2 control and close the normally open power supply contacts 121 and 121a, respectively, in the power leads of the motors. As a case starts to move into the apparatus of the invention, the various control switches must be closed at the proper instant by a case 4 moving into the apparatus on the conveyor 6 when the control switch 103 connected in parallel therewith is opened by the control shaft 97 and associated control cam, then the circuit for the main drive motor 110 will be opened and the operation of the apparatus will be interrupted until additional cases are supplied in proper position in the apparatus by the conveyor 6 and the switch 114 is closed to start the motor 110.

The control switch 16 associated with the support plate 7 is the next one effecting operation of the apparatus and the switch 16 must be actuated by cases 4 passing over the control switch 16 and the control spring arm 15 thereof for movement onto the case support platform. At the time when this switch 16 should be actuated by a case moving thereover, the control switch 104, in parallel therewith, is opened so that the switch 16 should be closed to line 119 to maintain energization of the control relay 116 for proper operation of the drive motor 110. Should no case be present on the support plate 7 at such time, the switch 16 stays at its normal position to engage lead 122 and a red light 123 is energized when the control relay 116 opens. The drive motor 110 can be started again by the start switch 115 when proper cases are supplied to the apparatus and one is on the support plate 7 for feeding to the apparatus for case filling action.

The control switch 105 is operatively connected to the power supply lead 112 so that it will normally supply power to the control coil of a second relay 124. The relay 124 controls contacts 125, normally open, in the power circuit of the magnetic clutch 128 referred to hereinbefore to close such contacts on relay energization to maintain such clutch energized as long as the switch 105 is in the closed position shown. Switch 105 only opens when the sub-frame 3 and associated means are moving towards the case support plate and articles have moved into but have not quite filled the grid 33. However, when the switch 105 is open, and current flow to the magnetic clutch 128 is interrupted, low speed drive from the motor 25 will now be transmitted to the conveyor 26 by the overrunning clutch 28a and associated means. The magnetic clutch 128 is in stand-by connection to the motor awaiting energization of the magnetic clutch for high speed conveyor drive. Conventional means rectify the A.C. current for energization of the magnetic clutch 128. The control switch 81 is in series with the bottle infeed switch 96 while the cam operated switch 106 is in parallel with the two switches for control action. The bottle infeed switch 96 is held closed as long as sufficient articles are being processed or supplied to the conveyor 24 where the switch 96 is positioned to insure a good supply of bottles to the apparatus for continued operation thereof. The grid filling action is improved by an abundant supply of bottles thereto. Hence when normally closed control switch 106 is opened in the cycle of operation of the apparatus, bottles must have moved into the grid 33 and to permit the switch 81 to close to continue operation of the main drive motor 110 through motor starter M1. Hence, when the control switch 106 is opened, lead 123a and switches 81 and 96 keep the primary drive motor 110 operating and complete the case filling cycle of operation in the apparatus, or else suspend the main drive until sufficient bottles are available to the grid 33 and conveyor 24 for case filling action.

A green light 130 is energized when the control relay 116 is properly energized.

*Grid Removal*

In the apparatus of the invention, it is possible to remove an entire case filling grid assembly and replace it with another assembly. The grid movement members 53 of the cam 51 are removably carried by their associated frame means to release the cross bar 57 which retains a grid assembly on the frame extension 300, but to permit its removal when desired. The entire case filling grid 33, and all other means operatively carried thereby are removed by rolling the grid along on the rollers 34 and other supports provided to remove it from the downstream end of the frame extension 300. Then a new grid unit can be substituted to provide the desired number and positioning of enclosures therein for case filling action for the different type of a case to be filled.

Any conventional type of electric controls can be provided for the apparatus, but the interlocked circuit means described hereinabove is thought to provide effective and positive controls for proper and safe functioning of the apparatus.

Suitable adjustable lateral guides of conventional construction are provided to engage cases moving through the apparatus.

In some instances it may be desirable to provide a separate motor for feed of the input conveyor 6 to provide a separate control action therefor rather than driving it by the main drive motor and drive shaft 12. Also, it should be realized that any desired drive means and arrangement can be connected to the control cam plates 18 as long as they are driven in timed relation to the remaining operations or actuations in the apparatus of the invention. It obviously is possible to use other types or styles of partitions and partition means from that shown in association with the sub-frame 3 in the accompanying drawings.

It is believed that the operation of the apparatus of the invention is clear from the foregoing specification, and by the apparatus of the invention, the rapid, safe filling of cases with suitable articles such as filled soft drink bottles is rapidly effected. The apparatus is adapted to suspend its operation should no or insufficient number of articles to be fed to the apparatus for case filling action. If articles are being packed faster than the articles can be supplied to the apparatus, this means that the control switch 81 and/or 96 will be open at some times when the switch 105 opens. At such time the control or starter M1 for the main drive motor will be opened so that the main drive is suspended until sufficient articles have been fed into the case filling grid 33 to fill it and the switch 81 is released to move to its position connecting to the lead 123 at which time the operating coil for the motor starter M1 will again be energized and flow of cases through the apparatus for filling action will be resumed. Naturally, if the switch 81 is moved to contact lead 123a when the switch 105 is open, then operation of the main drive motor 110 will be continuous and cases will move through the apparatus without interruption.

The apparatus of the invention functions effectively and positively for the purposes stated so that it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. Apparatus for packing bottles or other articles into cases therefor comprising a frame, case support and conveyor means on said frame to move empty cases through a predetermined path and position successive cases for article feeding action, means for feeding the articles in a plurality of parallel rows, a sub-frame, conveyor means on said sub-frame for receiving the articles from said feeding means and moving them along said sub-frame while being maintained in parallel rows, means pivotally positioning said sub-frame and conveyor means at the upstream end thereof above said case support and conveyor means, means engaging the free end of said sub-frame to control the position thereof and to move said conveyor means vertically towards and away from said case support and conveyor means, a case filling grid carried by said sub-frame to receive articles from said conveyor means and position them in case filling arrangement, clamp means operatively connected to said frame and carried by said sub-frame to clamp against the next articles to move into said grid and hold them stationary upon movement of said sub-frame towards said case support and conveyor means, control means operatively connected to said frame and engaging said grid to move it longitudinally away from said conveyor means on continued movement of said sub-frame towards said case support and conveyor means, and means normally supporting articles in said grid carried by said sub-frame and operatively connected to said frame to release such articles on further movement of said sub-frame towards said case support and conveyor means.

2. Apparatus for packing bottles or other articles into cases therefor comprising a frame, case support means on said frame to position cases for article filling action, a sub-frame, conveyor means on said sub-frame for moving articles therealong while maintaining them in parallel rows, means pivotally positioning said sub-frame and conveyor means at the upstream end thereof above said case support and conveyor means, means engaging said sub-frame to control the position thereof and to move said conveyor means vertically towards and away from said case support and conveyor means, a case filling grid carried by said sub-frame to receive articles from said conveyor means and position them in case filling arrangement, means operatively carried by said sub-frame to prevent the next articles to move into said grid from moving thereinto after said grid is filled, control means operatively connected to said frame and engaging said grid to move it longitudinally from said conveyor means on movement of said sub-frame towards said case support and conveyor means, and means normally supporting articles in said grid and operatively connected to said frame to release such articles on further movement of said sub-frame towards said case support and conveyor means.

3. Apparatus for packing bottles or other articles into cases therefor comprising a frame, case support and conveyor means on said frame to move empty cases through a predetermined path and position successive cases for article feeding action, a sub-frame, conveyor means on said sub-frame for moving articles therealong and maintaining them in parallel rows, means pivotally positioning said sub-frame and conveyor means at the upstream end thereof above said case support and conveyor means, means engaging the free end of said sub-frame to control the position thereof and to move said conveyor means vertically towards and away from said case support and conveyor means, a case filling grid carried by said subframe to receive articles from said conveyor means and position them in case filling arrangement, clamp means operatively connected to said frame and carried by said sub-frame to clamp against the next articles to move into said grid and hold them stationary upon movement of said sub-frame towards said case support and conveyor means, and means normally supporting articles in said grid operatively carried by said sub-frame and operatively connected to said frame to release such articles on further movement of said sub-frame towards said case support and conveyor means.

4. In case packing apparatus, frame means, a grid unit having a plurality of apertured enclosures provided thereby movably carried by said frame means, a reference member positioned adjacent said frame means, means engaging said frame means to move it with relation to said reference member, cam means connected between said grid unit and said frame means to move said grid unit on said frame means, control means operatively connected between said reference member and said cam means to move said grid member on said frame means on movement of said frame means with relation to said reference means, a plurality of retainer bars extending longitudinally of said grid unit across said enclosures thereof for article support action, positioning means engaging said retainer bars to form a unit therefrom, control arms movably securing said positioning means on said frame means, and a second control means operatively connected between said reference member and said control arms to move said positioning means and said retainer bars to an inoperative position on predetermined movement of said frame means with relation to said reference member.

5. In case packing apparatus, frame means, a grid unit having a plurality of open top and bottom apertured enclosures provided thereby carried by said frame means, a reference member positioned adjacent said frame means, means engaging said frame means to move it with relation to said reference member, a plurality of readily removable retainer bars extending longitudinally of said grid unit across said enclosures thereof for article support action, spring fingers secured to said grid and extending downwardly therefrom to control movement of articles dropped through said grid, said retainer bars being the only control for receiving articles on said grid and controlling drop of articles through said grid and past said spring fingers, positioning means engaging said retainer bars to form a unit therefrom, control arms movably securing said positioning means on said frame means, and a control means operatively connected between said reference member and said control arms to move said positioning means and said retainer bars to an inoperative position on predetermined movement of said frame means with relation to said reference member to release articles supported thereon for movement through the said enclosures of said grid unit.

6. In case packing or filling apparatus, a stationary member, a case filling grid, means supporting said grid for movement with relation to said stationary member for case filling action, rows of articles being fed to said grid for grid filling action, clamp means on said grid supporting means to engage articles immediately prior to being fed to said grid, means operatively connected between said stationary member and said clamp means to actuate said clamp means and stop movement of articles to said grid when said grid support means is moved with relation to said stationary member, means operatively connected between said stationary member and said grid to move said grid and articles therein longitudinally as a unit upon movement of said grid towards a case, retaining means carried by said grid to enable articles to be slid therealong for movement to case filling positions, and release means operatively connected between said stationary member and said retaining means to move said retaining means to a release position on continued movement of said grid towards a case.

7. In case packing apparatus, a stationary member, a case filling grid, means supporting said grid for movement with relation to said stationary member for case filling action, rows of articles being fed to said grid for grid filling action, roller means engaging said grid and movably positioning it on said supporting means, means operatively connected between said stationary member and said grid to move said grid and articles therein longitudinally as a unit upon movement of said grid towards a case, retaining means carried by said grid to enable articles to be slid therealong for movement to case filling positions, and release means operatively connected between said stationary member and said retaining means to move said retaining means to a release position on continued movement of said grid towards a case.

8. In case packing apparatus including means for positioning a case for packing, a stationary member, a case filling grid, means supporting said grid adjacent said stationary member for movement towards and away from a case on said case positioning means, means associated with said supporting means for feeding rows of articles to said grid, means associated operatively with said feeding means to stop flow of articles to said grid when it is filled, means operatively connected between said stationary member and said grid to move said grid and articles therein longitudinally as a unit upon movement of said grid towards a case, retaining means carried by said grid to retain articles therein normally but being free for movement to a release position for articles theretofor retained thereby in said grid, and control means operatively connected between said stationary member and said retaining means to move said retaining means to a release position on continued movement of said grid towards a case.

9. In case packing apparatus including means for positioning a case for packing, a stationary member, a case filling grid, means supporting said grid for movement with relation to said stationary member towards and away from a case on said case positioning means, means for feeding rows of articles to said grid to fill it with articles, partition means operatively associated with said grid to maintain articles fed thereto in rows, means operatively connected between said stationary member, grid supporting means, and said grid to move said grid and articles therein longitudinally as a unit upon movement of said grid towards a case on said case positioning means, retaining means operatively associated with said grid to aid in the feeding of articles thereinto to fill said grid but to be movable to a release position to release articles retained thereby in association with said grid, and release means operatively connected between said stationary member and said retaining means to move said retaining means to a release position on continued movement of said grid towards a case.

10. In apparatus for depositing articles into a case or container, a case positioning member, a grid for positioning articles in case filling positions, means supporting said grid and being movable with said grid towards and from said case positioning member, means connecting said last-named means to said case positioning member to move such member towards said grid by movement of said grid towards such member, and article feeding means operatively associated with said grid supporting means to start the feed of articles to said grid as said grid supporting means is moved away from said case positioning member.

11. In apparatus for depositing articles into a case or container, a case positioning member, a grid for positioning articles in case filling positions, means positioning said grid and being movable with said grid positioned thereby towards and from said case positioning member, means connecting said last-named means to said case positioning member to move such member and any case thereon towards said grid only when said grid is moved towards such member, and means carried by said grid positioning means and operatively connected to said grid to release articles carried thereby when said grid is approaching a case on said case positioning member.

12. In apparatus for packing articles into cases, a grid onto which abutted articles are fed and are positioned in substantially case filling positions, a sub-frame on which said grid is movably positioned, a main frame, said sub-frame being movable with relation to said main frame, means operatively connected between said grid and sub-frame and main frame to move said grid longitudinally of said sub-frame when said sub-frame moves towards said main frame, spacer arms pivotally carried by said grid at spaced transverse portions thereof for movement to positions intermediate abutted articles on said grid to move certain of such articles in opposite directions longitudinally of said grid, and means operatively connected between said grid and main frame and said spacer arms to move them to positions between abutted articles on movement of said sub-frame towards said main frame.

13. In apparatus for packing articles into cases, a grid onto which abutted articles are fed in one direction and are stationarily positioned in substantially case filling positions, a stop member to limit movement of articles onto said grid, a spacer arm pivotally carried by said grid for each row of articles received on said grid for movement to positions intermediate abutted articles in rows on said grid to move such articles in opposite directions on the axis of movement of articles onto said grid, a control member connected to said stop member to move it in the direction of article feed after said grid is filled with articles, and means operatively associated with and connected to said spacer arms to move them to positions between abutted articles on said grid after movement of said stop member to position such articles in more accurate case filling positions.

14. Apparatus for packing bottles or other articles into cases therefor comprising a frame, case support and conveyor means on said frame to move empty cases through a predetermined path and position successive cases for article feeding action, means for feeding the articles in a plurality of parallel rows, a sub-frame, conveyor means on said sub-frame for receiving the articles from said feeding means and moving them along said sub-frame while being maintained in parallel rows, means pivotally positioning said sub-frame and conveyor means at the upstream end thereof above said case support and conveyor means, means engaging the free end of said sub-frame to control the position thereof and to enable said conveyor means to move vertically towards and away from said case support and conveyor means, a case filling grid carried by said sub-frame to receive articles from said conveyor means and position them in case filling arrangement, and means operatively associated with said grid and normally supporting articles in said grid but being operatively connected to said frame to release such articles on movement of said sub-frame towards said case support and conveyor means to drop articles into a said case.

15. In apparatus for packing articles into cases, a grid onto which articles are fed and are positioned in substantially case filling positions, a sub-frame on which said grid is movably positioned, a main frame, said sub-frame being movable with relation to said main frame, means operatively connected between said grid and sub-frame and main frame to move said grid longitudinally of said sub-frame when said sub-frame moves towards said main frame, said last named means including lever arms pivotally carried by said grid, a stop member for articles moving into said grid operatively positioned on said lever arms, resilient devices operatively connecting said lever arms to said main frame to move said lever arms on movement of said sub-frame towards said main frame, and means including cam means connecting said stop member to said grid to move it downstream a short distance with movement of said lever with relation to said grid to free articles thereon for final positioning on said grid.

16. In apparatus for packing articles into cases, a grid onto which abutted articles are fed and are positioned in substantially case filling positions, a sub-frame on which said grid is movably positioned, a main frame, said sub-frame being movably secured to said main frame, means operatively connected between said grid and sub-frame and main frame to move said grid longitudinally of said sub-frame when said sub-frame moves towards said main frame, said last named means including lever arms pivotally carried by said grid, a stop member for articles moving into said grid operatively positioned on said lever arms, members operatively connecting said lever arms to said main frame to move said lever arms on movement of said sub-frame towards said main frame, means including cam means connecting said stop member to said grid to move said stop member downstream a short distance upon movement of said lever arms with relation to said grid to free articles thereon for final positioning on said grid, and pusher means operatively carried by said grid for movement to positions intermediate articles on said grid for moving them into spaced positions more closely corresponding to case filling positions therefor.

17. In apparatus for packing articles into cases, frame means, a conveyor journalled on said frame means, drive means for said conveyor, speed control means connecting said drive means to said conveyor and having a normal speed and a slow speed connection, a grid for positioning articles in case filling positions carried by said frame means to receive articles at one end of said grid from said conveyor, stop means carried by said grid at the opposite end thereof to engage articles and prevent further movement thereof into said grid, and a timed control means operatively connected to said speed control means to shift such speed control means from normal speed drive to slow speed drive when articles on said grid for case filling action are approaching contact with said stop means on said grid.

18. In apparatus for packing articles into cases, a grid including an outer frame and center means on which articles are fed and are positioned in substantially case filling positions, said center means having a plurality of apertures therein corresponding in size and number and positioning to the articles to be placed in a case, frame means on which said grid is movably positioned, a main frame, said frame means being movable towards and from said main frame, means operatively connected between said grid and frame means and main frame to move said grid longitudinally of said frame means when said frame means moves towards said main frame; said last-named means including lever arms pivotally carried by said grid and moved by action of said last-named means on movement of said frame means towards said main frame, and a stop member for articles moving into said grid operatively positioned on said lever arms; said stop member being positioned on said grid by brackets secured to said outer frame, bracket arms pivotally secured to said brackets and extending upwardly therefrom, cam means secured to said lever arms, cam follower means carried by said bracket arms at the upstream ends thereof and engaging said cam means, said stop member being engaged and carried by said bracket arms at downstream portions thereof, said cam means moving said stop member downstream upon movement of said lever arms with relation to said grid.

19. In apparatus for packing articles into cases, a grid onto which articles are fed and are positioned in substantially case filling positions, frame means on which said grid is movably positioned, a main frame, said frame means being movable towards and from said main frame, means operatively connected between said grid and frame means and main frame to move said grid longitudinally of said frame means when said frame means moves towards and away from said main frame; said last-named means including lever arms pivotally carried by said grid for movement on relative movement of said frame means and main frame, and a stop member for articles moving into said grid operatively positioned on said lever arms; said stop member being positioned on said grid by means including bracket arms pivotally associated to said grid and extending upwardly therefrom, interengaging cam and cam follower means carried by said bracket arms and lever arms, said stop member being carried by said bracket arms, said cam and cam follower means moving said stop member downstream upon movement of said lever arms with relation to said grid which movement is produced by movement of said frame means towards said frame.

20. In apparatus for packing articles into cases, frame means, a conveyor journalled on said frame means, drive means for said conveyor normally connected thereto for continuous drive thereof, speed control means connecting said drive means to said conveyor and having a normal speed and a slow speed connection, a grid for positioning articles in case filling positions carried by said frame means to receive articles from said conveyor, brake means carried by said frame means to engage articles on said conveyor and prevent further movement thereof towards said grid, and endless article engaging means carried by said frame means to engage articles on said conveyor and urge them into engagement therewith for movement at the speed of said conveyor, said article engaging means being connected to said drive means to move at the speed of said conveyor for aiding movement of articles thereon.

21. In apparatus for packing articles into cases, frame means, a conveyor journalled on said frame means and receiving and transferring articles thereon in the form of a plurality of streams of articles, drive means for said conveyor connected thereto for drive thereof, a grid for positioning articles in case filling positions carried by said frame means to receive a plurality of streams of articles from said conveyor, brake means carried by said frame means to engage articles on said conveyor and prevent further movement thereof towards said grid, and a plurality of endless article engaging means each having article engaging portions carried by said frame means parallel to the axis of said conveyor to engage articles in the different streams of articles on said conveyor at an upstream relation to said brake means and urge them to move at the speed of said conveyor, said article engaging means being individually movable vertically with relation to said conveyor, said article engaging means being connected to said drive means to move the article engaging portions thereof at the speed of said conveyor.

22. In apparatus for packing articles into cases, a frame, frame means movably mounted on said frame for relative movement therebetween, a conveyor journalled on said frame means, drive means for said conveyor connected thereto for drive thereof, a grid for positioning articles in case filling positions carried by said frame means to receive articles from said conveyor, brake means carried by said frame means and continually urged to engage articles on said conveyor and prevent further movement thereof towards said grid, means operatively associated with said frame and frame means and connected to said brake means to release said brake means at predetermined portions of the relative movement between said frame means and said frame, and endless article engaging means carried by said frame means to engage articles on said conveyor upstream of said brake means and urge them into engagement with said conveyor for movement at the speed of said conveyor, said article engaging means being connected to said drive means to move at the speed of said conveyor for aiding movement of articles thereon but with articles on said conveyor and engaged by said brake means being held thereby against further movement with said conveyor.

23. In apparatus for packing articles into cases, a grid onto which abutted articles are fed and are positioned in substantially case filling positions, frame means on which said grid is movably positioned, a main frame, said frame means being pivotally secured to said main frame, means operatively connected between said grid and frame means and main frame to move said grid and any articles thereon longitudinally of said frame means when said frame means moves towards said main frame, spacer arms carried by said grid at transversely spaced portions thereof for movement to positions intermediate abutted articles on said grid to move certain of such articles in opposite directions longitudinally of said grid, control means operatively connected between said grid and main frame to control said spacer arms to move them to positions between abutted articles on movement of said frame means towards said main frame, retainer means movably associated with said grid to retain articles thereon for movement longitudinally thereof but being movable to an article release position for passage down through said grid, said control means also connecting to said retainer means to actuate them and move said retainer means to article engaging position when said frame means are in their zone of movement most remote from said frame, and resilient means operatively engaging said retainer means urging them to their article release positions upon release of said retainer means by said control means.

24. In apparatus for packing articles into cases, a grid onto which abutted articles are fed and are positioned in substantially case filling positions, frame means on which said grid is movably positioned, a main frame, said frame means being movable towards and from said main frame, means operatively connected between said grid and frame means and main frame to move said grid and any articles thereon downstream of said frame means when said sub-frame moves towards said main frame, spacer arms carried by said grid at spaced transverse portions thereof for movement of individual spacer arms to positions intermediate abutted articles in different rows on said grid to move groups of such articles in each row in opposite directions longitudinally of said grid, control means operatively connected between said grid and main frame to operate said spacer arms to move them to positions between abutted articles on movement of said frame means towards said main frame and after said grid has been moved downstream and retainer means movably associated with said grid and having normal positions to retain articles thereon for movement longitudinally thereof but being movable to an article release position for passage of articles down through said grid, said control means also connecting to said retainer means to actuate them and move said retainer means to article release position after said spacer arms have been moved between abutted articles.

25. In automatic cyclic apparatus for packing articles into cases, a grid onto which a plurality of streams of abutted articles can be led to be positioned in substantially case filling positions, driven means for supply of a plurality of streams of abutted articles to said grid, frame means on which said grid is movably positioned, a frame for said grid, rollers on said grid frame engaging said frame means to support said grid, lever and cam means operatively connected to said grid to move said grid and articles thereon longitudinally of said frame means after said grid is filled, and retainer means movably associated with said grid frame to retain articles on said grid for movement longitudinally thereof but being movable to an article release position for passage down through said grid, said lever and cam means including a bar extending transversely of said grid frame at the downstream end thereof, and bracket means on said frame means engaging said bar to retain said grid and grid frame on said frame means whereby removal of said bar permits removal of said grid and grid frame from the apparatus.

26. In automatic cyclic apparatus for packing articles into cases, driven means for supply of a plurality of streams of abutted articles, a grid onto which a plurality of streams of abutted articles are fed and are positioned in substantially case filling positions, a frame for said grid, frame means on which said grid frame is movably positioned, and means operatively connected to said grid to move said grid and articles thereon longitudinally of said frame means after said grid is filled, said last-named means including a bar extending transversely of said grid frame at the downstream end thereof, and means on said frame means engaging said bar to retain said grid and grid frame on said frame means whereby removal of said bar permits removal of said grid and grid frame from the apparatus.

27. In automatic cyclic apparatus for packing articles into cases, a grid onto which a plurality of streams of abutted articles are fed and are positioned in substantially case filling positions, driven means for supply of a plurality of streams of abutted articles to said grid, frame means on which said grid is movably positioned, driven cyclic timer means to control operation of the apparatus, means operatively connected to said grid to move said grid and articles thereon longitudinally of said frame means after said grid is filled, retainer means movably associated with said grid to retain articles thereon for movement longitudinally thereof but being movable to an article release position for passage down through said grid, control means connecting to said retainer means to actuate them and move said retainer means to article engaging position for grid filling action, resilient means operatively engaging said retainer means and urging them to their article release positions upon release of said retainer means by said control means, means for interrupting drive of said timer means when articles are not present in all streams of articles to be fed to said grid, case positioning means, driven means for feeding empty cases to said case positioning means, and means operatively connected between said case positioning means and said timer means for interrupting drive of said timer means when a case is not present on said case positioning means for article receipt when said grid is ready for article deposit.

28. In automatic cyclic apparatus for packing articles into cases, a grid onto which a plurality of streams of abutted articles are fed and are positioned in substantially case filling positions, driven means for supply of a plurality of streams of abutted articles to said grid, frame means on which said grid is movably positioned, driven cyclic timer means to control operation of the apparatus, means operatively connected to said grid to move said grid and articles thereon longitudinally of said frame means after said grid is filled, retainer means movably associated with said grid to retain articles thereon for movement longitudinally thereof but being movable to an article release position for passage down through said grid, control means connecting to said retainer means to actuate them and move said retainer means to article engaging position for grid filling action, resilient means operatively engaging said retainer means and urging them to their article release positions upon release of said retainer means by said control means, driven means for feeding empty cases to said case positioning means, and means for interrupting drive of said timer means when a case is not present on said case positioning means for article receipt when said grid is ready for article deposit.

29. In automatic cyclic apparatus for packing articles into cases, a grid onto which a plurality of streams of abutted articles are fed and are positioned in substantially case filling positions, driven means for supply of a plurality of streams of abutted articles to said grid, frame means on which said grid is movably positioned, driven cyclic timer means to control operation of the apparatus, means operatively connected to said grid to move said grid and articles thereon longitudinally of said frame means after said grid is filled, retainer means movably associated with said grid to retain articles thereon for movement longitudinally thereof but being movable to an article release position for passage down through said grid, control means connecting to said retainer means to actuate them and move said retainer means to article engaging position for grid filling action, resilient means operatively engaging said retainer means and urging them to their article release positions upon release of said retainer means by said control means, and means operatively connected between said grid and said timer means for interrupting drive of said timer means when articles are not present in all streams of articles to be fed to said grid.

30. In apparatus for packing articles into cases, a grid onto which rows of abutted articles are fed and are positioned in substantially case filling positions, grid positioning means, timing means for controlling a case filling cycle, means operatively connected to said timing means and to said grid to move said grid longitudinally of said grid positioning means after said grid has been filled with articles, said last-named means including lever arms pivotally carried by said grid, a resilient surfaced stop member for articles moving into said grid operatively positioned on said lever arms, means including cam means connecting said stop member to said grid to move said stop member downstream a short distance upon movement of said lever arms with relation to said grid to free articles thereon for final positioning on said grid, and pusher means operatively carried by said grid for movement to positions intermediate rows of articles on said grid for moving such articles in opposite directions into spaced positions more closely corresponding to case filling positions therefor.

31. In apparatus for packing articles into cases, a grid including an outer frame and center means on which articles are fed and are positioned in substantially case filling positions, said center means having a plurality of apertures therein corresponding in size and number and positioning to the articles to be placed in a case, frame means on which said grid is movably positioned, means operatively connected to said grid to move said grid longitudinally of said frame means when said grid is filled with articles, said last-named means including lever arms pivotally carried by said grid, and a stop member for articles moving into said grid operatively positioned on said lever arms; said stop member being positioned on said grid by brackets operatively secured to said outer frame, bracket arms pivotally secured to said brackets and extending upwardly therefrom, cam means secured to said levers, cam follower means carried by said bracket arms at the upstream ends thereof and engaging said cam means, said stop member being engaged and carried by said bracket arms at downstream portions thereof, said cam means moving said stop member downstream upon movement of said lever arms with relation to said grid.

32. In apparatus for packing articles into cases, a grid including an outer frame and center means on which articles are fed and are positioned in substantially case filling positions, said center means having a plurality of apertures therein corresponding in size and number and positioning to the articles to be placed in a case, frame means on which said grid is movably positioned, means operatively connected to said grid to move said grid longitudinally of said frame means when said grid is filled with articles, said last-named means including lever arms pivotally carried by said grid, a stop member for articles moving into said grid operatively positioned on said lever arms, and cam means operatively secured to said lever arms and controlling the position of said stop member relative to said grid, said cam means moving said stop member downstream upon movement of said lever arms with relation to said grid.

33. In cyclic apparatus for packing articles into cases, a frame, a conveyor journalled on said frame, drive means for said conveyor connected thereto for drive thereof, a grid for positioning articles in case filling positions carried by said frame to receive articles from said conveyor, brake means carried by said frame and continually urged to engage articles on said conveyor and prevent further movement thereof towards said grid, a driven cycle control means, means operatively associated with said frame but controlled by said cycle control means and connected to said brake means to release said brake means at predetermined portions of the operative cycle of the apparatus, and endless article engaging means carried by said frame means to engage articles on said conveyor upstream of said brake means and urge them into engagement with said conveyor for movement at the speed of said conveyor, said article engaging means being connected to said drive means to move at the speed of said conveyor for aiding movement of articles thereon but with articles on said conveyor and engaged by said brake means being held thereby against further movement with said conveyor.

34. In case packing apparatus, a stationary member, a case filling grid, a grid support means, a case support means, means positioning one of said two first-named means for movement with relation to said stationary member for case filling action, rows of abutted articles being fed to said grid for grid filling action, said grid being movably positioned on said grid support means, means operatively connected between said stationary member and said grid to move said grid and articles therein longitudinally as a unit upon relative movement of said grid support means and said case support means, retaining means carried by said grid to enable articles to be slid therealong for movement to case filling positions, and release means operatively connected between said stationary member and said retaining means to move said retaining means to a release position on continued relative movement of said grid support means and said case support means.

35. In case packing apparatus, a stationary member, a case filling grid, a grid support means, a case support means, means positioning one of said two first-named means for movement with relation to said stationary member for case filling action, rows of articles being fed to said grid for grid filling action, means on said grid movably positioning it on said grid support means, means operatively connected between said stationary member and said grid to move said grid and articles therein longitudinally as a unit upon relative movement of said grid support means and said case support means, retaining means carried by said grid to enable articles to be slid therealong for movement to case filling positions, release means operatively connected between said stationary member and said retaining means to move said retaining means to a release position on continued relative movement of said grid support means and said case support means, clamp means operatively connected to said grid supporting means to engage articles immediately prior to being fed to said grid, and means operatively connected between said stationary member and said clamp means to actuate said clamp means and stop movement of articles to said grid upon relative movement of said grid support means and said case support means.

36. In apparatus for packing articles into cases, a grid onto which abutted articles are fed and are positioned in substantially case filling positions, frame means on which said grid is movably positioned, means operatively connected to said grid to move said grid and any articles thereon longitudinally of said frame means after said grid is filled, spacer arms carried by said grid at transversely spaced portions thereof for movement to positions intermediate abutted articles on said grid to move certain of such articles in opposite directions longitudinally of said grid, control means operatively connected to said grid and spacer arms to control said spacer arms to move them to positions between abutted articles after movement of said grid on said frame means, retainer means movably associated with said grid to retain articles thereon for movement longitudinally thereof but being movable to an article release position for passage down through said grid, said control means also connecting to said retainer means to actuate them and move said retainer means to article engaging position for grid filling action, and resilient means operatively engaging said retainer means and urging them to their article release positions upon release of said retainer means by said control means.

References Cited in the file of this patent

UNITED STATES PATENTS

| | | |
|---|---|---|
| 1,853,392 | Zesbaugh | Apr. 12, 1932 |
| 2,254,860 | Rose | Sept. 2, 1941 |
| 2,358,447 | Creamer | Sept. 19, 1944 |
| 2,611,472 | Perky | Sept. 23, 1952 |
| 2,682,331 | Campbell | June 29, 1954 |
| 2,696,903 | Krupke | Dec. 14, 1954 |
| 2,727,664 | Ardell | Dec. 20, 1955 |
| 2,815,623 | Holstebroe | Dec. 10, 1957 |
| 2,819,576 | Hendricks et al. | Jan. 14, 1958 |
| 2,827,151 | Engleson et al. | Mar. 18, 1958 |
| 2,890,553 | Day et al. | June 16, 1959 |
| 2,898,715 | Cella | Aug. 11, 1959 |
| 2,921,425 | Seval | Jan. 19, 1960 |